US009763051B2

(12) United States Patent
Belghoul et al.

(10) Patent No.: US 9,763,051 B2
(45) Date of Patent: *Sep. 12, 2017

(54) METHOD AND APPARATUS FOR INDOOR LOCATION DETERMINATION WITH WLAN/WPAN/SENSOR SUPPORT

(71) Applicant: Apple Inc., Cupertino, CA (US)

(72) Inventors: Farouk Belghoul, Campbell, CA (US); Robert W. Mayor, Half Moon Bay, CA (US); Glenn D. MacGougan, San Jose, CA (US); Kumar Gaurav Chhokra, San Jose, CA (US); Syed A. Mujtaba, Santa Clara, CA (US); Dawei Zhang, Saratoga, CA (US); Tarik Tabet, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/014,487

(22) Filed: Feb. 3, 2016

(65) Prior Publication Data
US 2016/0234645 A1    Aug. 11, 2016

Related U.S. Application Data

(60) Provisional application No. 62/113,294, filed on Feb. 6, 2015, provisional application No. 62/159,340, filed on
(Continued)

(51) Int. Cl.
*H04W 4/02* (2009.01)
*G01C 5/06* (2006.01)
*H04W 4/22* (2009.01)

(52) U.S. Cl.
CPC .............. *H04W 4/025* (2013.01); *G01C 5/06* (2013.01); *H04W 4/22* (2013.01)

(58) Field of Classification Search
CPC ...... H04L 67/18; H04L 67/306; H04W 4/023; H04W 4/008; H04W 84/12; H04W 4/025;
(Continued)

(56) References Cited

U.S. PATENT DOCUMENTS

2005/0176441 A1* 8/2005 Jurecka ................. G01S 19/09
455/456.1
2008/0228654 A1    9/2008 Edge
(Continued)

OTHER PUBLICATIONS

Patent Application No. PCT/US2016/016410—International Search Report and Written Opinion mailed on May 25, 2016.

*Primary Examiner* — Anthony Addy
*Assistant Examiner* — Jing Gao
(74) *Attorney, Agent, or Firm* — Downey Brand LLP

(57) ABSTRACT

Apparatus and methods for estimating a location of a wireless device in communication with a wireless network, such as an LTE/LTE-A network, based at least in part on WLAN/WPAN AP measurements and/or barometric measurements are disclosed. The wireless device responds to a location capability inquiry from the wireless network by providing a response that indicates the wireless device is configurable to estimate its location based on WLAN/WPAN AP and/or barometric measurements. The wireless network sends WLAN/WPAN AP and/or barometric reference information to the wireless device to assist in estimating its location. The wireless device measures one or more WLAN/WPAN APs, and the wireless device uses the WLAN/WPAN AP and/or barometric measurements to estimate its location. In some embodiments, GPS/GNSS information is used in conjunction with WLAN/WPAN AP and/or barometric measurements to estimate the location of the wireless device.

23 Claims, 6 Drawing Sheets

Related U.S. Application Data on May 10, 2015, provisional application No. 62/246,559, filed on Oct. 26, 2015, provisional application No. 62/159,341, filed on May 10, 2015, provisional application No. 62/246,558, filed on Oct. 26, 2015.

(58) Field of Classification Search
CPC ..... H04W 4/021; H04W 4/028; H04W 4/043; H04W 76/02; H04W 28/0215; H04W 28/08; H04W 36/0083; H04W 36/22; H04W 36/30
USPC ...................................................... 455/456.1
See application file for complete search history.

(56) References Cited

U.S. PATENT DOCUMENTS

| | | |
|---|---|---|
| 2010/0291947 A1 | 11/2010 | Annamalai |
| 2012/0013475 A1 | 1/2012 | Farley et al. |
| 2012/0258733 A1 | 10/2012 | Fischer et al. |
| 2014/0094178 A1 | 4/2014 | Eskicioglu et al. |
| 2014/0106789 A1 | 4/2014 | Moeglein et al. |
| 2015/0011236 A1* | 1/2015 | Kazmi ................ H04W 52/365 455/456.1 |
| 2015/0149133 A1* | 5/2015 | Do ....................... G01C 21/206 703/6 |
| 2016/0234644 A1 | 8/2016 | Belghoul et al. |

\* cited by examiner

METHOD AND APPARATUS FOR INDOOR LOCATION DETERMINATION WITH WLAN/WPAN/SENSOR SUPPORT

CROSS-REFERENCE TO RELATED APPLICATIONS

This Application claims the benefit of U.S. Provisional Application No. 62/113,294, entitled "METHOD AND APPARATUS FOR LOCATION DETERMINATION WITH WLAN SUPPORT", filed Feb. 6, 2015, U.S. Provisional Application No. 62/159,340, entitled "METHOD AND APPARATUS FOR LOCATION DETERMINATION WITH WLAN/WPAN/SENSOR SUPPORT", filed May 10, 2015, U.S. Provisional Application No. 62/246,559, entitled "METHOD AND APPARATUS FOR LOCATION DETERMINATION WITH WLAN/WPAN/SENSOR SUPPORT", filed Oct. 26, 2015, U.S. Provisional Application No. 62/159,341, entitled "METHOD AND APPARATUS FOR INDOOR LOCATION DETERMINATION WITH WLAN/WPAN/SENSOR SUPPORT", filed May 10, 2015, and U.S. Provisional Application No. 62/246,558, entitled "METHOD AND APPARATUS FOR INDOOR LOCATION DETERMINATION WITH WLAN/WPAN/SENSOR SUPPORT", filed Oct. 26, 2015, the contents of each of which are incorporated by reference herein in their entireties for all purposes.

This Application is related to U.S. patent application Ser. No. 15/014,477, entitled "METHOD AND APPARATUS FOR LOCATION DETERMINATION WITH WLAN/WPAN/SENSOR SUPPORT", filed concurrently herewith, the content of which is incorporated by reference herein in its entirety for all purposes.

FIELD

The described embodiments generally relate to wireless communications, including, to methods and apparatus for indoor location determination of a wireless communication device with wireless local area network (WLAN), wireless personal area network (WPAN), and/or barometric sensor support.

BACKGROUND

Wireless communication devices, such as cellular telephones, cellular-enabled tablet computers, and other portable wireless devices with cellular communications capability can include wireless circuitry that can provide for communication in accordance with various wireless communication protocols. For example, cellular telephones, typically, include wireless personal area network (WPAN) radio frequency (RF) circuitry, such as Bluetooth® circuitry, and wireless local area network (WLAN) RF circuitry, such as Wi-Fi circuitry, to supplement cellular RF circuitry. Besides wireless communication capabilities, the WLAN RF circuitry and/or WPAN RF circuitry can provide, indirectly, a capability for a wireless communication device to estimate its location, e.g., a set of geospatial coordinates, using information based on RF signals received from one or more WLAN/WPAN access points (APs). (The use of the term "access point" or AP herein generally refers to a central wireless communication device that acts as a hub for a wireless network to interconnect multiple wireless communication devices. The AP can include a WLAN AP and/or a "master" WPAN device, which can be referred herein to informally as a WPAN AP.) The wireless communication device can be configured to use WLAN/WPAN AP information to supplement and/or to use in lieu of global positioning system (GPS) or global navigation satellite system (GNSS) information when estimating the location of the wireless communication device. When the wireless communication device operates indoors or in other locations in which GPS/GNSS signals can be attenuated or unavailable, the WLAN/WPAN AP information can be used to assist with estimating the location of the wireless communication device.

Multiple standards organizations define methods for location estimation, also referred to herein as positioning determination, for wireless communication devices, including the Third Generation Partnership Project (3GPP), which defines and publishes wireless communication protocols such as versions of Global System for Mobile Communications (GSM), Universal Mobile Telecommunications Services (UMTS), Long Term Evolution (LTE), and Long Term Evolution Advanced (LTE-A), the Open Mobile Alliance (OMA), which defines and publishes open standards for the mobile phone industry that apply across multiple cellular network technologies, and the Institute of Electrical and Electronics Engineers (IEEE), which standardizes wireless local area network (WLAN) communication protocols, such as the 802.11 family of standards. Each of the standards organizations can publish information about location/positioning aspects for wireless communication devices. Within 3GPP, standardized 3G and 4G wireless communication protocols, such as UMTS and LTE/LTE-A, include signaling layers, such as the radio resource control (RRC) layer at the control plane and the radio resources location services protocol (RRLP) at the user plane. The 4G wireless communication protocols such as LTE/LTE-A include an LTE positioning protocol (LPP) at the control plane and the secure user plan location (SUPL) at the user plane. Furthermore, the OMA has defined LPP container extensions (LPPe) to support newer technologies, e.g., improved assisted GNSS (A-GNSS), observed time difference of arrival (OTDOA), and use of WLAN at the control plane, and SUPL3.0 at the user plane. Additionally, the IEEE committee generates an 802.11v wireless network management protocol and an 802.11mc communication protocol, which will be published forthwith as the 802.11-2015 wireless communication protocol.

Regulatory bodies, such as the Federal Communications Commission (FCC), may require that emergency services, such as "911", have access to the location of a wireless communication device, and, for "enhanced 911" (E911) services, may require that the availability of location estimation of wireless communication devices extend to indoor locations (or other locations in which GPS/GNSS can be inaccurate or unavailable). The FCC may require that 67% of wireless communication device connections be locatable for E911 purposes within an accuracy of 50 meters and that 95% of such connections be locatable within an accuracy of 150 meters. For "next generation 911" (NG911) services, to be introduced within the next five years, the FCC may recommend that 80% of connected wireless communication device be locatable within an accuracy of 50 meters for a horizontal (latitude/longitude) direction and within an accuracy of 3 meters for a vertical (altitude) direction. Current wireless communication devices, using limited GPS/GNSS information, can achieve an accuracy of only approximately 250 to 500 meters today.

As such, there exists a need for solutions that provide methods and apparatuses for assisting indoor location estimation by a wireless communication device using additional information, such as based on information about and/or measurements obtained from WLAN/WPAN APs and barometric sensors included in the wireless communication device. In this regard, it would be beneficial to provide for methods and apparatus that leverage WLAN/WPAN AP mappings and barometric sensor measurements to replace or supplement GPS/GNSS information used for estimating the location of a wireless communication device, particularly when connected to a wireless cellular network for emergency services access and when the wireless communication device operates in an indoor location, at which GPS/GNSS information may be limited or unavailable.

SUMMARY

Apparatus and methods for estimating a location, which can include an indoor location, of a wireless communication device using a combination of GPS/GNSS signals (when available) and WLAN/WPAN information, such as WLAN/WPAN AP mapping and WLAN/WPAN AP measurements, alone or in combination with barometric sensor information, are described. Wireless communication devices can include a GPS/GNSS capability that uses GPS/GNSS signals to provide a location of the wireless communication device when such GPS/GNSS signals are available. Wireless communication devices can supplement the GPS/GNSS capability with a WLAN/WPAN access point (AP) location estimation capability, particularly for indoor location estimation when the GPS/GNSS signals can be attenuated or unavailable. Additionally, barometric sensor information can be used to estimate a vertical position (e.g., relative or absolute altitude) of the wireless communication device. The WLAN/WPAN AP and barometric sensor based location estimation capability can be used to improve the accuracy of location estimates for the wireless communication device, e.g., when the wireless communication device uses an emergency service (such as 911, E911, or NG911). In some embodiments, a WLAN/WPAN AP and barometric sensor based location estimate can be used in place of GPS/GNSS based estimates, e.g., when GPS/GNSS signals are not available. In some embodiments, the WLAN/WPAN AP and barometric sensor based location estimate can be used to supplement GPS/GNSS based estimates, e.g. when GPS/GNSS signals are attenuated. In some embodiments, the wireless communication device can estimate its location using WLAN/WPAN AP signals and WLAN/WPAN AP mapping information, e.g., available in one or more databases in, associated with, and/or reachable by the wireless communication device. In some embodiments, the wireless communication device can estimate its vertical position using barometric sensor information and barometric reference data, e.g., available in one or more databases in, associated with, and/or reachable by the wireless communication device. In some embodiments, the wireless communication device can estimate its location based on WLAN/WPAN AP signals and WLAN/WPAN AP mapping information, without requiring access to a cellular wireless network. In some embodiments, the wireless communication device can estimate its vertical location based on barometric sensor information and barometric reference data, without requiring access to a cellular wireless network. In some embodiments, the wireless communication device uses GPS/GNSS based estimates when operating in areas in which WLAN/WPAN access is limited or unavailable and WLAN/WPAN AP and barometric sensor based estimates (or a combination of GPS/GNSS and WLAN/WPAN AP and barometric sensor based estimates) when operating in areas in which WLAN/WPAN access exists with a high density of WLAN/WPAN APs. In some embodiments, WLAN/WPAN AP information can be used to determine a "horizontal" location of the wireless communication device and additional information derived from one or more sensors in and/or associated with the wireless communication device can be used to determine a "vertical" location of the wireless communication device. In some embodiments, a barometric sensor can be used to determine the "vertical" location of the wireless communication device. In some embodiments, the wireless communication device uses barometric sensor information in combination with reference barometric data maintained in the wireless communication device and/or obtained via a wireless network (e.g., a cellular wireless network, a WLAN, and/or a WPAN), such as reference barometric data that provides a barometric pressure value for a "sea level" or other "reference" vertical location/position value.

A wireless communication device can estimate its location using a combination of WLAN/WPAN AP measurements and WLAN/WPAN AP mapping information available in the wireless communication device, e.g., a locally stored and/or locally accessible WLAN/WPAN AP mapping. A wireless communication device can also estimate its location using WLAN/WPAN AP measurements and WLAN/WPAN AP mapping information supplemented by GPS/GNSS signals when available. In some embodiments, the wireless communication device uses barometric sensor data, alone or in combination with reference barometric data, to estimate a vertical location of the wireless communication device In some embodiments, the wireless communication device obtains WLAN/WPAN AP information and/or reference barometric data from a cellular wireless network, a non-cellular wireless network, and/or a server reachable via a wireless network (cellular or non-cellular). In some embodiments, a cellular wireless network provides a list of WLAN/WPAN APs to be used for location (positioning) estimation to the wireless communication device, e.g., based on cell identifier (ID) information, location area information, geo-fencing information, or other information that identifies an area/region in which the wireless communication device operates. The cellular wireless network can provide a list of WLAN/WPAN APs that are suitable for location estimation based on a particular cell or set of cells to which the wireless communication device is associated and/or connected. In some embodiments, the wireless communication device determines a set of WLAN/WPAN APs available for location estimation by scanning for and discovering available WLAN/WPAN APs without using (and/or supplementing) a list of WLAN/WPAN APs obtained from a wireless network (cellular and/or non-cellular). The wireless communication device can gather information, e.g., measurements and/or broadcast information, provided by the set of available WLAN/WPAN APs, and send this information to one or more cellular wireless network elements, e.g., a base station and/or radio network controller or a combination of these (or an equivalent network element operating at a user plane level and/or a network element at a control plane level) of a cellular wireless network, which can process the information and/or provide the information to one or more other network elements for processing. In some embodiments, the cellular wireless network operates in accordance with a Long Term Evolution (LTE) wireless communication protocol and/or Long Term Evolution Advanced (LTE-A) wireless communication protocol, and the cellular wireless network element is an evolved NodeB (eNodeB) network element of an LTE/LTE-A cellular wireless network. In some embodiments, the wireless communication device is a user equipment that includes a Secure User Plane Location (SUPL) capability, e.g., to operate as an SUPL enabled terminal (SET), and the cellular wireless network element is an SUPL location platform (SLP). In some embodiments, the cellular wireless network operates in accordance with an LTE wireless communication protocol and/or an LTE-A wireless communication protocol, and the cellular wireless network element is an evolved serving mobile location center (E-SMLC). In some embodiments, the cellular wireless network operates in accordance with an LTE wireless communication protocol and/or an LTE-A wireless communication protocol, and the cellular wireless network element is an evolved universal terrestrial radio access network (E-UTRAN) or a portion of network elements included therein. In some embodiments, a combination of network elements of a cellular wireless network cooperate together to provide information to the wireless communication device and/or to process information provided by the wireless communication device to assist with location determination of the wireless communication device. The cellular wireless network can process the WLAN/WPAN AP information alone and/or use WLAN/WPAN AP mapping information to estimate a location (position) of the wireless communication device. In some embodiments, one or more servers and/or other processing and storage computing systems, can gather WLAN/WPAN AP information from multiple wireless communication devices and process the gathered WLAN/WPAN AP information to construct and/or update a map or database of WLAN/WPAN APs. In some embodiments, a cellular wireless network provides barometric reference data to be used for location (positioning) estimate, such as for "vertical" location estimation, by the wireless communication device. In some embodiments, the barometric reference data provides a reference "sea level" barometric value that can be applicable to a position of the wireless communication device (or within a particular radial distance of the wireless communication device). In some embodiments, the barometric reference data is provided and/or updated as the wireless communication device changes its "horizontal" location. In some embodiments, the wireless communication device maintains a database (or access a database) that associates barometric reference data with other location information, such as with a set of location coordinates.

In some embodiments, a server, which can be a network element of a cellular wireless network, e.g., an evolved serving mobile location center (E-SMLC) requests capabilities of a wireless communication device, e.g., a user equipment (UE), of the UE's capabilities, e.g., when the UE associates with and/or connects with the cellular wireless network, and the UE provides information concerning its capabilities for location determination, e.g., GPS, GNSS, WLAN AP, WPAN AP, barometric sensor location estimation capabilities. In some embodiments, communication of messages between the UE and one or more network elements, e.g., an E-SMLC server, are formatted as LPP messages. In some embodiments, the capability inquiry sent by the server and the capability response sent by the UE are formatted as one or more LPP messages. In some embodiments, the UE indicates to the E-SMLC that the UE is capable of determining its location using a combination of GPS/GNSS information, WLAN/WPAN AP information, and/or barometric sensor information, e.g., WLAN/WPAN AP measurements, WLAN/WPAN AP mapping information, barometric sensor information, and/or barometric reference data, and the E-SMLC confirms with the UE its provided location estimation capabilities.

In some embodiments, the UE requests location estimation assistance data from one or more network elements, e.g., the E-SMLC, such as WLAN/WPAN AP mapping information, barometric reference data, etc. The E-SMLC, in response to the request for location estimation assistance data provides the requested location estimation assistance data to the UE. In some embodiments, the E-SMLC provides the location estimation assistance data in one or more messages, e.g., in a single message or in a series of messages. In some embodiments, the E-SMLC can provide the requested location assistance information to the UE as part of one or more signaling messages, e.g., communicated to an eNodeB and then via a radio resource control (RRC) connection and/or via broadcast system information block (SIB) messages. In some embodiments, the E-SMLC can provide the requested location assistance information via an SUPL Location Platform (SLP) using an SUPL bearer to the UE, e.g., operating as an SUPL Enabled Terminal (SET). The location assistance information can include WLAN/WPAN AP mapping information and/or barometric reference data with which the UE can measure signals from available WLANs, WPANs, and or use barometric sensor data to estimate a location of the UE.

In some embodiments, the E-SMLC requests location information from the UE and provides a set of measurements for the UE to perform, e.g., WLAN/WPAN AP measurements and/or barometric sensor measurements. In some embodiments, the UE uses a combination of WLAN/WPAN AP measurements and WLAN/WPAN AP mapping information, alone or in combination with GPS/GNSS data, to determine a location estimate for the UE. In some embodiments, the UE uses barometric sensor information, alone or in combination with barometric reference data, to determine a "vertical" location estimate for the UE. The UE can provide an estimate of its location, e.g., "horizontal" and/or "vertical" location estimates, as determined by the UE, to the E-SMLC, via the eNodeB, e.g., as part of one or more measurement report signaling messages communicated via an RRC connection, or via an SUPL bearer to the SLP, which can further communication with the E-SMLC.

In some embodiments, the E-SMLC sends the location request to the UE in response to a location request for the UE from another network element, such as from a core network element that requests the UE location in associated with an emergency services connection, such as an "E911" call. In some embodiments, the E-SMLC provides an UE location estimate provided by the UE to the requesting core network element. In some embodiments, the location request from the core network originates as part of an emergency services connection, which can be initiated by the user of the UE. In some embodiments, the UE provides measurements, e.g., GPS/GNSS data and/or WLAN/WPAN AP measurement data and/or WLAN/WPAN AP mapping information and/or barometric sensor information, to one or more networks, as part of a measurement report signaling message communicated via an RRC connection, and the one or more network elements use the provided measurements to estimate a location of the UE. In some embodiments, the one or more network elements include a server that maintains WLAN/WPAN AP mapping information and/or barometric reference data to assist with estimating the location of the UE.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Figure 1:
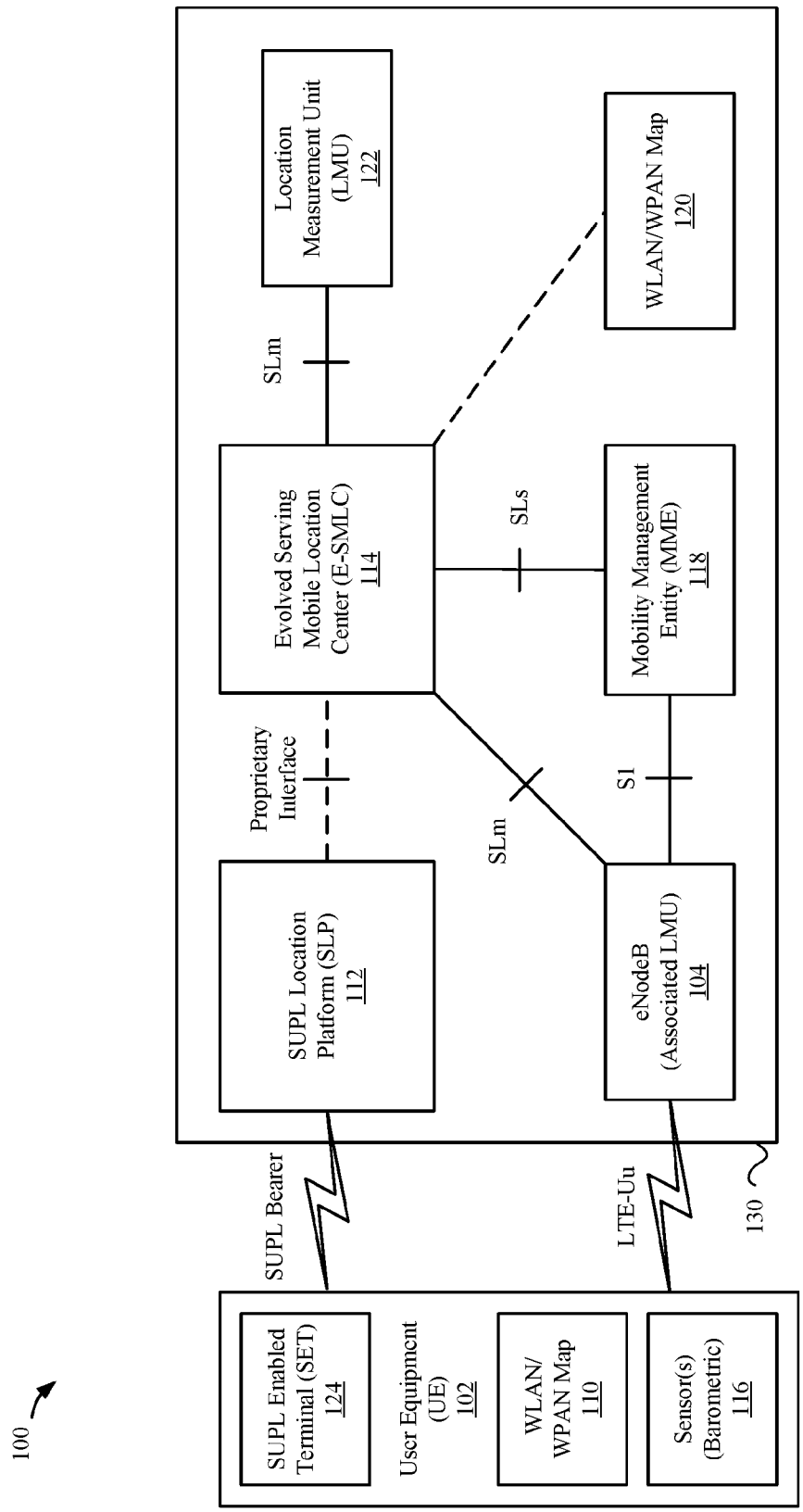
FIG. 1 depicts a wireless communication system, which can comply with a 3GPP Evolved Universal Terrestrial Radio Access Network (E-UTRAN) air interface wireless communication protocol, such as an LTE/LTE-A wireless communication protocol, in accordance with some embodiments.

Representative applications of systems, methods, apparatuses, and computer program products according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or as an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. In some embodiments, the wireless communication device can include a Bluetooth® (or more generically a WPAN) wireless communication subsystem or radio that can implement a Bluetooth wireless communication protocol, such as developed and published by the Bluetooth Special Interest Group (SIG).

Wireless communication networks that operate in accordance with UMTS wireless communication protocols can provide for location (positioning) determination (estimation) using a combination of signaling via a Radio Resource Control (RRC) connection at the control plane and communication via the Radio Resource Location Services Protocol (RRLP) at the user plane. A UMTS wireless communication network can use one or more of the following positioning methods: a cell identifier (ID) based method, an observed time difference of arrival (OTDOA) method, which can involve network-assisted configurable idle time periods, a network-assisted GPS/GNSS method, and an uplink time difference of arrival (U-TDOA) method. LTE/LTE-A wireless communication networks can provide additionally for location determining using LPP and/or LPPe protocols. Current UMTS wireless communication networks and LTE/LTE-A wireless communication networks do not provide support for location determination by a wireless communication device using WLAN/WPAN AP support, such as based on WLAN/WPAN AP measurements and/or WLAN/WPAN AP mapping information, while the wireless communication device operates within an indoor (or outdoor) location, nor do UMTS wireless networks or LTE/LTE-A wireless networks provide for a hybrid method that can use a combination of GPS/GNSS information and WLAN/WPAN AP measurements and mapping information for location determination. Current UMTS and LTE/LTE-A wireless networks also do not support barometric sensor measurements to estimate a vertical location of a wireless communication device. In addition, current UMTS, LTE, and LTE-A location determination methods can be unable to satisfy new or future emergency services requirements, such as FCC mandated E911 and NG911 location capabilities, which can require increased accuracy in both horizontal location and vertical location determination.

To satisfy E911 and NG911 location requirements for both UMTS and LTE/LTE-A wireless networks, both UMTS and LTE/LTE-A wireless communication protocols can be extended to support WLAN/WPAN information for WLAN/WPAN-based and/or hybrid WLAN/WPAN/A-GPS/GNSS-based location determination for wireless communication devices. Furthermore, MUTS and LTE/LTE-A wireless communication protocols can be extended to support barometric information for UE-based, UE-assisted, and/or network-based modes to estimate a vertical location of a UE, including when operating in an indoor location. As described further herein, UMTS and LTE/LTE-A wireless communication protocols can be extended to support location determination by wireless communication devices using WLAN/WPAN AP measurement and mapping information, alone or in combination with GPS/GNSS information, as well as with barometric information, such as from a barometric sensor in the UE and with barometric reference data. UE-based solutions, in which the UE provides a location estimate, and UE-assisted solutions, in which the UE provides additional information, such as WLAN/WPAN AP measurements and/or barometric sensor measurements, to network elements of a wireless network to determine a location estimate can be used by the UE and the wireless network to estimate both a "horizontal" location of the UE (e.g., longitude/latitude coordinates) and a "vertical" location of the UE (e.g., altitude). The solutions described herein can be used to extend location determination capabilities to wireless communication device operating in indoor locations while also increasing accuracy of location estimates provided by wireless communication devices and/or network elements, e.g., in response to location queries for emergency services.

In some embodiments, methods and apparatus to estimate a location (position) of a UE based on WLAN/WPAN information and/or GPS/GNSS supplemented with WLAN/WPAN information and/or barometric information include the UE providing location determination (also referred to as positioning) capability to network elements of a wireless network, e.g., to one or more access network elements of an evolved universal terrestrial radio access network (E-UTRAN), in response to an inquiry for UE capabilities. In some embodiments, the access network elements of the E-UTRAN can request whether the UE supports positioning capabilities, including, for example, specific types of location determination capabilities, e.g., the ability to process WLAN/WPAN information, GPS/GNSS information, barometric information, etc. to estimate a location of the UE and/or to assist in estimating a location of the UE. In some embodiments, the access network elements of the E-UTRAN can request and/or provide location assistance data, e.g., a list of measurement information elements, a list of WLAN/WPAN access points, an indication of location of the UE (indoor, outdoor, entering indoor, exiting indoor, etc.). In some embodiments, the access network elements of the E-UTRAN provide barometric reference data for the UE to use in conjunction with barometric sensor measurements to estimate a location of the UE, e.g., an absolute altitude estimate (in recognized units) and/or a relative altitude estimate (a floor location of a building). In some embodiments, the access network elements of the E-UTRAN can request location information from the UE, and the UE can respond with one or more of: location information, WLAN/WPAN measurements, GPS/GNSS information, barometric information, one-time measurement reports, periodic measurement reports. In some embodiments, e.g., UE-based solutions, the UE estimates its location (position) based on GPS/GNSS information and/or WLAN/WPAN measurements and/or barometric information and provides an estimate of the UE location to one or more access network elements of a cellular wireless network. In some embodiments, e.g., UE-assisted solutions, the UE provides information to one or more access network elements of a cellular wireless network to assist the access network elements (and/or other network elements) of the cellular wireless network to estimate/determine a location of the UE, e.g., by use of measurement information, such as WLAN/WPAN AP measurements in addition to and/or in place of GPS/GNSS information, and/or barometric sensor measurements alone or in conjunction with barometric reference data, and network elements of the cellular wireless network use the information alone or in combination with additional information, such as WLAN/WPAN AP mapping information and/or barometric reference data, to estimate/determine a location/position of the UE.

FIG. 1 depicts a wireless communication system 100, which can comply with a 3GPP Evolved Universal Terrestrial Radio Access Network (E-UTRA) air interface wireless communication protocol, e.g., an LTE/LTE-A wireless communication protocol, and can include, but is not limited to including, a user equipment (UE) 102 in wireless communication with one or more network elements of an LTE/LTE-A (E-UTRA) wireless network 130, including an eNodeB 104 (also referred to herein as a base station). The UE 102 can connect with one or more eNodeBs 104 to access services provided by and/or through a cellular wireless network. In some embodiments, the UE 102 can include (e.g., stored in local and/or associated storage units) WLAN/WPAN AP mapping information (e.g., a "WLAN/WPAN map") 110, which can include information for a set of WLAN/WPAN APs that can be used to assist with location determination/estimation by the UE 102. In some embodiments, the UE 102 can include one or more sensors 116, such as a barometric sensor, which can be used alone or in combination with barometric reference data to determine an absolute or relative vertical location, e.g., an altitude, of the UE 102. In some embodiments, the UE 102 can include barometric reference data accessible from local storage and/or remote storage, the barometric reference data providing information with which the UE 102 can "calibrate"

barometric sensor information to determine/estimate a vertical location of the UE 102. In some embodiments, the barometric reference data includes atmospheric pressure data for sea level (or at another specified reference vertical position). In some embodiments, one or more network elements, e.g., eNodeB 104, which can include an associated location management unit (LMU), a Secure User Plan Location (SUPL) Location Platform (SLP) 112, and/or an Evolved Serving Mobile Location Center (E-SMLC) 114, can provide barometric reference data to assist the UE 102 when using locally measured barometric sensor information to determine a vertical location of the UE 102. In some embodiments, the barometric reference data can vary over time and can be periodically and/or on demand updated for the UE 102. In some embodiments, the barometric reference data is a mean sea level pressure (MSLP). In some embodiments, one or more eNodeBs 104 can include an associated location management unit (LMU) with which to access location information and/or determine/estimate a location for one or more UEs 102. In some embodiments, a stand-alone LMU 122 can be interconnected with the E-SMLC 114 by means of a wired and/or wireless connection. The stand-alone LMU 122 can provide additional access location information that can be used for determining/estimating a location/position for one or more UEs 102. In some embodiments, the UE 102 can operate as an SUPL Enabled Terminal (SET) and can communicate with the SLP 112 via an SUPL bearer, e.g., to request location assistance information, to obtain location assistance information, such as WPAN/WLAN mapping information and/or barometric reference data, to provide location estimates determined by the UE 102, and/or to provide location information, such as WLAN/WPAN measurements and/or barometric sensor measurements, to assist with location estimation for the UE 102.

The LTE/LTE-A (E-UTRA) wireless network 130 can include one or more additional network elements, such as the stand-alone Evolved Serving Mobile Location Center (E-SMLC) 114, the SUPL Location Platform (SLP) 112, and one or more eNodeBs 104, which alone or in combination can estimate a location for one or more UEs 102 based on information provided by the UE 102, and/or obtained from a database that contains WLAN/WPAN AP mapping information, such as WLAN/WPAN map 120 connected to the E-SMLC 114. The wireless network elements can use any combination of methods for UE location estimation based on information obtained from the UE 102, such as using cell ID and/or time arrival information, supplemented by GPS/GNSS and/or WLAN/WPAN AP measurement information and/or barometric reference data in combination with barometric sensor information. The wireless network elements can obtain information for WLAN/WPAN AP mapping and coordinates that can be stored and/or be accessible via the WLAN/WPAN map 120. In some embodiments, the WLAN/WPAN map 120 includes information for a set of WLAN/WPAN APs, such as medium access control (MAC) addresses, WLAN/WPAN AP names such as service set identifiers (SSIDs), basic service set identifiers (BSSIDs), and GPS/GNSS location information (or other geo-location coordinates) that can be used to assist in location estimation of one or more UEs 102 by network elements of the E-UTRA wireless communication system 100. The arrangement of network elements of the E-UTRA wireless communication system 100 can provide for both UE-based location estimation and UE-assisted location estimation based on WLAN/WPAN AP information (measurements and/or mapping data), supplemented in some embodiments with barometric sensor information and barometric reference data for vertical location (altitude) estimation, as well as hybrid methods that combine WLAN/WPAN AP information with GPS/GNSS (or assisted GPS/GNSS) information.

The E-UTRA wireless communication system 100 can determine capabilities of the UE 102 by requesting location (positioning) capabilities from the UE 102, e.g., as part of a UE capabilities inquiry. The UE 102 can respond with a list of location estimation capabilities of the UE, such as whether the UE supports UE-based location estimation, network-based location estimation, both UE-based and network-based location estimation, or no location estimation capabilities. In some embodiments, the UE location capabilities information provided by the UE 102 to the E-UTRA wireless communication system 100 can indicate location estimation capabilities of the UE 102 that are based on WLAN/WPAN AP information, and thus, the UE 102 can include other location estimation capabilities, such as GPS/GNSS location estimation capabilities, without necessarily supporting location estimation capabilities using and/or supplemented by WLAN/WPAN AP information. In some embodiments, the E-UTRA wireless communication system 100 can inquire whether the UE 102 includes one or more sensors to assist with location estimation, such as barometric sensor capabilities to assist with vertical location estimation. In some embodiments, the UE 102 can indicate support for UE-based, network-based, both UE-based and network-based, or no capability for barometric information modes, such as inclusion of a barometric sensor and/or vertical location estimation using barometric information (e.g., based on barometric sensor measurements with or without barometric reference data). In some embodiments, the UE 102 provides a location estimate to the E-UTRA wireless communication system 100 based at least in part on WLAN/WPAN AP information stored in, accessible to, and/or obtained by the UE 102, e.g., from within local and/or associated storage units, and/or obtained from associated servers via an LTE/LTE-A wireless network, which can include the E-UTRA wireless communication system 100. In some embodiments, the UE 102 provides location estimation information, such as WLAN/WPAN AP measurements, WLAN/WPAN AP mapping information, cell measurements, barometric sensor measurements, and can indicate whether the information provided are current (single shot) or historical (multiple shot). The UE 102 can provide the information on a one-time basis or periodically based on a configuration of the UE 102, in some embodiments. Network elements of the LTE wireless network can use the provided location information to assist with estimating a location of the UE 102.

Figure 2A:
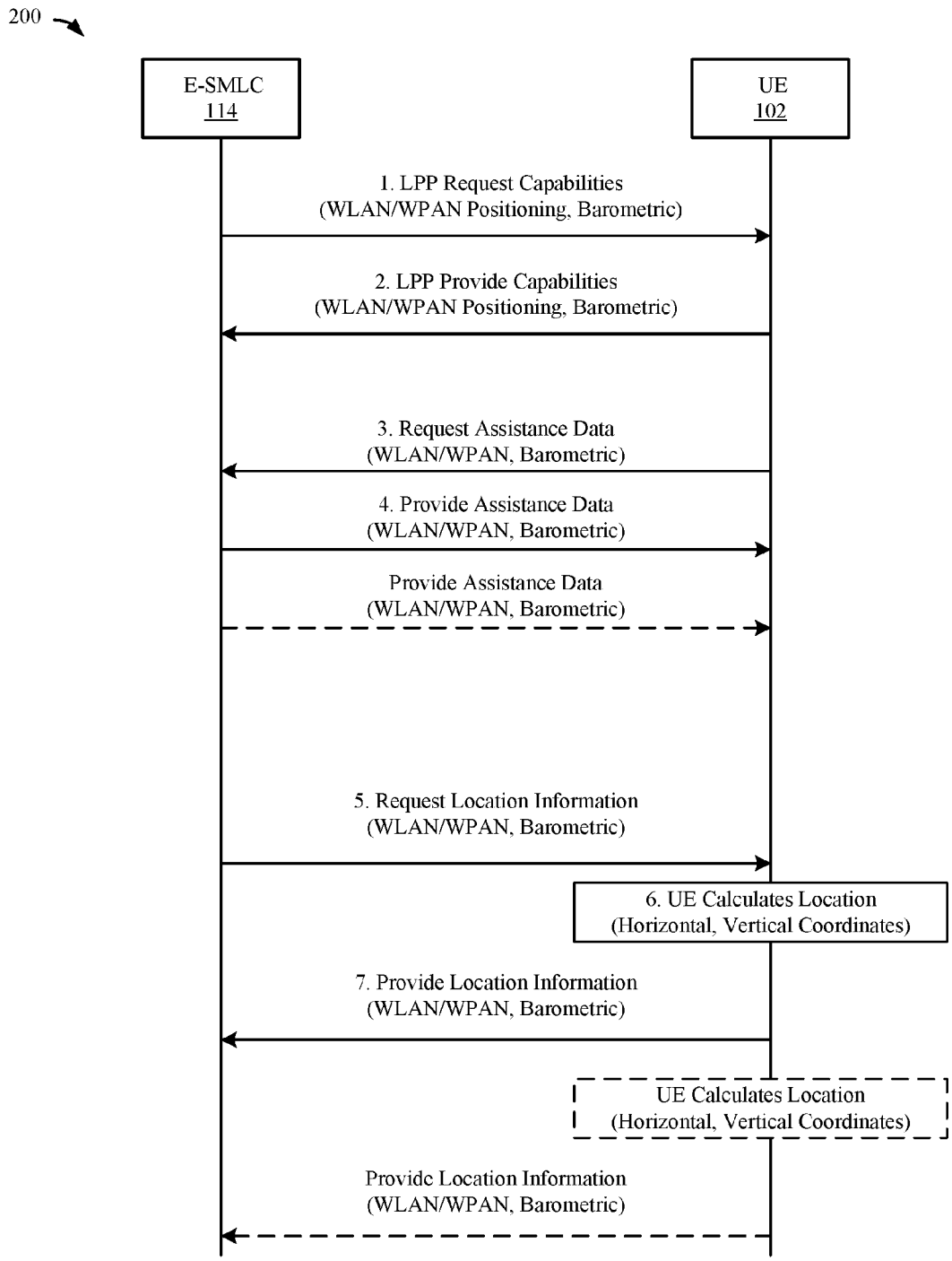
FIG. 2A illustrates a diagram of an exchange of messages between network elements of an LTE wireless network and user equipment (UE) as part of a UE-based location estimation procedure that can include the use of WLAN/WPAN information, barometric information, and assisted GPS/GNSS (A-GPS/A-GNSS) information, in accordance with some embodiments.

FIG. 2A illustrates a diagram 200 of an exchange of messages between various network elements of an LTE/LTE-A wireless network and the UE 102 as part of a UE-based location estimation procedure that can include the use of WLAN/WPAN information, barometric information, and assisted GPS/GNSS (A-GPS/A-GNSS) information. In a first step, the E-SMLC 114 sends a message to the UE 102 inquiring about capabilities of the UE 102. The UE capability inquiry can be part of an LPP Request Capabilities message sent to the UE 102 by the E-SMLC 114. The UE capability inquiry can include a request for general or specific UE capabilities, such as location estimation capabilities that the UE 102 can provide. For example, the LPP Request Capabilities message can specifically inquire about capabilities for WLAN/WPAN AP positioning and/or barometric information processing of the UE 102. In a second step, the UE 102 can respond to the UE capabilities inquiry from the E-SMLC 114 by providing UE capability information, e.g., as part of an LPP Provide Capabilities message sent to the E-SMLC 114. The UE capability information provided by the UE 102 to the E-SMLC 114 can include information about whether the UE 102 can perform location estimation, e.g., based on WLAN/WPAN information (such as WLAN/WPAN measurements and/or WLAN mapping data) obtained by the UE 102 (whether directly gathered by the UE 102 from one or more WLAN/WPAN APs and/or obtained by the UE 102 indirectly from a server or other network storage element), and/or whether the UE 102 can provide WLAN/WPAN AP information for location estimation, e.g., to assist one or more network elements to estimate a location of the UE 102. The UE capability information provided by the UE 102 to the E-SMLC 114 can also include information about whether the UE 102 includes one or more sensors, such as a barometric sensor, which can be used in combination with barometric reference data to estimate a vertical location (absolute or relative altitude) of the UE 102. In some embodiments, e.g., as illustrated in FIG. 2A by steps 1 and 2, the request for UE capabilities is solicited of the UE 102 by a network element, such as the E-SMLC 114. In some embodiments (not illustrated), the UE 102 can send an LPP Provide Capabilities message to a network element, such as the E-SMLC 114, without solicitation from the E-SMLC 114, e.g., an unsolicited LPP Provide Capabilities message (or equivalent message) sent by the UE 102. In some embodiments, the request for UE capabilities and the response to provide UE capabilities occurs upon power up, at attachment to a network element, during a location update, when associating with a cell of a wireless network, when switching cells, and/or during handover between wireless network cells.

In a third step, the UE 102 can request from the E-SMLC 114 location assistance data, e.g., as part of a Request Assistance Data message, including but not limited to WLAN/WPAN assistance information, WLAN/WPAN mapping information, barometric reference information, etc. In response to the request for location assistance data from the UE 102, in a fourth step, the E-SMLC 114 can provide WLAN/WPAN assistance information and/or barometric reference information to the UE 102, e.g., as part of one or more messages. In some embodiments, the messages are sent as one or more measurement control signaling messages, as part of a separate set of assistance data delivery, and/or as part of one or more broadcast system information block (SIB) messages. The UE 102 can receive WLAN/WPAN assistance information, assisted GPS information, and/or barometric reference information in one or more formatted messages in accordance with specific formats described herein and/or based on extensions or variations thereof. The WLAN/WPAN assistance information can include a list of preferred WLAN APs (e.g., a set of Wi-Fi APs), a list of WPAN beacons, a set of information with which to locate WLAN APs and/or WPANs, e.g., SSIDs, heSSIDs, MAC addresses, etc. In some embodiments, the WLAN/WPAN assistance information can include a set of radio frequency channels for the UE 102 to scan, e.g., a set of Wi-Fi channels, and/or a set of WLAN radio frequency bands for the UE 102 to scan, e.g., a set of Wi-Fi bands. In some embodiments, the barometric reference information can include a set of reference values for atmospheric pressure levels, e.g., mean sea level pressure (MSLP) values, which the UE 102 can use for calibration of an embedded sensor, such as a barometric sensor in the UE 102, and/or for estimation vertical location of the UE 102 based on barometric sensor measurements taken by (or obtained by) the UE 102.

In a fifth step, the E-SMLC 114 can request location information from the UE 102, which can include a request for a location estimated by the UE 102 (a UE-based estimate), a request for a location estimated by the UE 102 and additional location information with which the E-SMLC 114 (and/or one or more other network elements) can estimate a location of the UE 102 (a UE-assisted estimate), and/or a request for location information that can be used by one or more network elements to estimate a location of the UE 102 (a network-based estimate). In some embodiments, the request for location information includes a request for WLAN/WPAN information and/or barometric information. In an sixth step, in response to the request for location information received from the E-SMLC 114, the UE 102 can estimate its location, e.g., based on WLAN/WPAN AP information obtained by the UE 102 directly or indirectly, based on barometric sensor and reference data (when available), and optionally based on additional GPS/GNSS (or A-GPS/A-GNSS) information. In a seventh step, the UE 102 can send information about its location to the E-SMLC 114. In some embodiments, the location information sent by the UE 102 can be included in a measurement report message and/or another signaling message sent to the E-SMLC 114. The UE location information can include a set of UE-based location coordinates, which can include "horizontal" location information (e.g., surface coordinates) and/or "vertical" location information (e.g., altitude). In some embodiments, the UE 102 estimates its location based on WLAN/WPAN AP information and/or based on barometric sensor information and provides the location estimate to the E-SMLC 114, which forwards the estimated location of the UE 102 to additional network elements within and/or associated with the LTE/LTE-A wireless network for processing to estimate a location of the UE 102 and/or to use the location estimate of the UE 102 for additional purposes, such as in response to an emergency services request from the UE 102. In some embodiments, the UE 102 repeats calculation of its location, such as based on updated measurements, and provides additional location information, such as an updated location estimate and/or updated WLAN/WPAN AP information and/or updated barometric sensor information to the E-SMLC 114.

In some embodiments, various steps shown in FIG. 2A can be mandatory or optional as part of an extension to an LPP/LPPe protocol (and/or as part of another applicable LTE/LTE-A wireless communication protocol that supports location estimation/determination for the UE 102). In some embodiments, the first and second steps, to request positioning capabilities of the UE 102 and for the UE 102 to provide positioning capabilities are required, while the third and fourth steps to request assistance data by the UE 102 and to provide assistance data to the UE 102 are optional. In some embodiments, the fifth and seventh steps to request location information from the UE 102 and for the UE 102 to provide location information in response to the request for location information are required. In some embodiments, the third and fourth steps to request assistance data by the UE 102 and to provide assistance data to the UE 102 can occur after the request location information message of the fifth step. Thus, after receiving a request for location information from the E-SMLC 114, the UE 102 can respond with a request for assistance data from the E-SMLC 114, which can respond with a provide assistance data message, the contents of which the UE 102 can use in conjunction with UE-based measurements to estimate a location of the UE 102.

In some embodiments, a request capabilities messages sent to the UE 102, e.g., from the E-SMLC 114 of the E-UTRA wireless communication system 100, which can be part of an LTE/LTE-A wireless network, can be formatted in accordance with the following structure as part of a Release 13 (R13) 3GPP wireless communication protocol and/or to be backward-compatible to a Release 9 (R9) 3GPP wireless communication protocol (or for one or more intervening 3GPP Release 10 (R10), Release 11 (R11), or Release 12 (R12) 3GPP wireless communication protocols). In some embodiments, an example structure for a Request Capabilities message, both in an R13 form and in a backward compatible R9 form, includes:

```
-- ASN1START
RequestCapabilities ::= SEQUENCE {
    criticalExtensions      CHOICE {
        c1                  CHOICE {
            requestCapabilities-r9    RequestCapabilities-r9-IEs,
            requestCapabilities-r13   RequestCapabilities-r13-IEs,
            spare3 NULL, spare2 NULL, spare1 NULL
        },
        criticalExtensionsFuture  SEQUENCE { }
    }
}
RequestCapabilities-r9-IEs ::= SEQUENCE {
    commonIEsRequestCapabilities  CommonIEsRequestCapabilities
    OPTIONAL,  -- Need ON
    a-gnss-RequestCapabilities    A-GNSS-RequestCapabilities
    OPTIONAL,  -- Need ON
    otdoa-RequestCapabilities     OTDOA-RequestCapabilities
    OPTIONAL,  -- Need ON
    ecid-RequestCapabilities      ECID-RequestCapabilities
    OPTIONAL,  -- Need ON
    epdu-RequestCapabilities      EPDU-Sequence
    OPTIONAL,  -- Need ON
    wlan-bt-RequestCapabilities   WLAN-BT-RequestCapabilities
    OPTIONAL,  -- Need ON
    barometric-RequestCapabilities BAROMETRIC-RequestCapabilities
    OPTIONAL,-- Need ON
    ...
}
RequestCapabilities-r13-IEs ::= SEQUENCE {
    wlan-bt-RequestCapabilities   WLAN-BT-RequestCapabilities
    OPTIONAL,  -- Need ON
    barometric-RequestCapabilities BAROMETRIC-RequestCapabilities
    OPTIONAL,-- Need ON ...
}
-- ASN1STOP
```

The Request Capabilities R9 compatible Information Element (IE) includes request for location estimation capabilities of the UE 102, such as assisted GNSS (A-GNSS) capabilities, observed time difference of arrival (OTDOA) capabilities, enhanced cell identifier (ECID) capabilities, wireless local area network (WLAN) and Bluetooth (BT) (which can also refer to WPAN) capabilities, and barometric sensor capabilities. The Request Capabilities R13 IE includes wireless local area network (WLAN) and Bluetooth (BT) (which can also refer to WPAN) capabilities, and barometric sensor capabilities.

In some embodiments, the WLAN-BT-RequestCapabilities and Barometric-RequestCapabilities information elements (IEs) can include the following elements as part of a structured formatted message:

```
-- ASN1START
WLAN-BT-RequestCapabilities ::= SEQUENCE {
    assistanceDataSupportListReq BOOLEAN,
    locationVelocityTypesReq    BOOLEAN,
    LocationVerticalReq          Boolean,
    ...
}
BAROMETRIC-RequestCapabilities ::= SEQUENCE {
    CalibrationDataSupportListReq  BOOLEAN,
    ...
}
-- ASN1STOP
```

The WLAN-BT-RequestCapabilities IE can include a field, which is labeled above as an "assistanceDataSupportListReq" field, and which includes a Boolean value (e.g., true/false) to specify whether a target wireless communication device, e.g., the UE 102, is requested to include a list of assistance data for WLAN/WPAN (WLAN/BT) location determination by the UE 102. The Barometric-RequestCapabilities IE can include a field, which is labeled above as a "CalibrationDataSupportListReq" field, and which includes a Boolean value (e.g., true/false) to specify whether a target wireless communication device, e.g., the UE 102, is requested to include a list of calibration data for barometric sensor use by the UE 102 as part of location determination by the UE 102.

In some embodiments, a provide capabilities response message sent by the UE 102 to a network element, e.g., the E-SMLC 114 of the E-UTRA wireless communication system 100, which can be part of an LTE/LTE-A wireless network, can be formatted in accordance with the following structure as part of a Release 13 (R13) 3GPP wireless communication protocol and/or to be backward-compatible to a Release 9 (R9) 3GPP wireless communication protocol (or for one or more intervening 3GPP Release 10 (R10), Release 11 (R11), or Release 12 (R12) 3GPP wireless communication protocols). In some embodiments, an example structure for a Provide Capabilities message, both in an R13 form and in a backward compatible R9 form, includes:

```
-- ASN1START
ProvideCapabilities ::= SEQUENCE {
    criticalExtensions      CHOICE {
        c1                  CHOICE {
            provideCapabilities-r9    ProvideCapabilities-r9-IEs,
            provideCapabilities-r13   ProvideCapabilities-r13-IEs,
            spare3 NULL, spare2 NULL, spare1 NULL
        },
        criticalExtensionsFuture  SEQUENCE { }
    }
}
ProvideCapabilities-r9-IEs ::= SEQUENCE {
    commonIEsProvideCapabilities  CommonIEsProvideCapabilities
    OPTIONAL,
    a-gnss-ProvideCapabilities    A-GNSS-ProvideCapabilities
    OPTIONAL,
    otdoa-ProvideCapabilities     OTDOA-ProvideCapabilities
    OPTIONAL,
    ecid-ProvideCapabilities      ECID-ProvideCapabilities
    OPTIONAL,
    epdu-ProvideCapabilities      EPDU-Sequence
    OPTIONAL,
    wlan-bt-ProvideCapabilities   WLAN-BT-ProvideCapabilities
    OPTIONAL,
    barometric-ProvideCapabilities BAROMETRIC-ProvideCapabilities
    OPTIONAL,
    ...
}
ProvideCapabilities-r13-IEs ::= SEQUENCE {
    wlan-bt-ProvideCapabilities   WLAN-BT-ProvideCapabilities
    OPTIONAL,
```

```
    barometric-ProvideCapabilities   BAROMETRIC-ProvideCapabilities
OPTIONAL,
}
-- ASN1STOP
```

The Provide Capabilities R9 compatible Information Element (IE) includes fields to indicate location estimation capabilities of the UE 102, such as assisted GNSS (A-GNSS) capabilities, observed time difference of arrival (OTDOA) capabilities, enhanced cell identifier (ECID) capabilities, wireless local area network (WLAN) and Bluetooth (BT) (which can also refer to WPAN) capabilities, and barometric sensor capabilities. The Provide Capabilities R13 IE includes wireless local area network (WLAN) and Bluetooth (BT) (which can also refer to WPAN) capabilities, and barometric sensor capabilities.

In some embodiments, the WLAN-BT-ProvideCapabilities and Barometric-ProvideCapabilities information elements (IEs) can include the following elements as part of a structured formatted message:

```
- ASN1START
    WLAN-BT-ProvideCapabilities ::= SEQUENCE {
        assistanceDataSupportList AssistanceDataSupportList,
        VelocityTypes     VelocityTypes, //( supported or not)
        LocationVertical     Boolean,  //(supported or not)
        ...
    }
    BAROMETRIC-ProvideCapabilities ::= SEQUENCE {
        calibrationDataSupportList  CalibrationDataSupportList,
        ...
```

```
    }
-- ASN1STOP
```

The WLAN-BT-ProvideCapabilities IE can include a sequence of information, which is labeled above as an "assistanceDataSupportList", and which can include a list of WLAN APs (e.g., Wi-Fi APs), WPAN Data (e.g., Bluetooth Beacons), WLAN frequency channels, WLAN frequency bands, and/or other information usable by a target wireless communication device, e.g., the UE 102, for WLAN/WPAN (WLAN/BT) location determination. The Barometric-ProvideCapabilities IE can include a sequence of information, which is labeled above as a "CalibrationDataSupportList", and which can include a list of calibration data for barometric sensor use by the UE 102 as part of location determination by the UE 102, e.g., a set of barometric reference data for the UE 102, which can include mean sea level pressure (MSLP) values.

In some embodiments, a request location information message sent to the UE 102, e.g., from the E-SMLC 114 of the E-UTRA wireless communication system 100, which can be part of an LTE/LTE-A wireless network, can be formatted in accordance with the following structure as part of a Release 13 (R13) 3GPP wireless communication protocol and/or to be backward-compatible to a Release 9 (R9) 3GPP wireless communication protocol (or for one or more intervening 3GPP Release 10 (R10), Release 11 (R11), or Release 12 (R12) 3GPP wireless communication protocols). In some embodiments, an example structure for a Request Location Information message, both in an R13 form and in a backward compatible R9 form, includes:

```
--- ASN1START
RequestLocationInformation ::= SEQUENCE {
    criticalExtensions    CHOICE {
        c1          CHOICE {
            requestLocationInformation-r9RequestLocationInformation-r9-
IEs,
            requestLocationInformation-r13    RequestLocationInformation-
r13-IEs,
            spare3 NULL, spare2 NULL, spare1 NULL
        },
        criticalExtensionsFuture SEQUENCE { }
    }
}
RequestLocationInformation-r9-IEs ::= SEQUENCE {
        commonIEsRequestLocationInformation
            CommonIEsRequestLocationInformation    OPTIONAL,  -- Need ON
        a-gnss-RequestLocationInformation      A-GNSS-
RequestLocationInformation                     OPTIONAL,  -- Need ON
        otdoa-RequestLocationInformation       OTDOA-
RequestLocationInformation                     OPTIONAL,  -- Need ON
        ecid-RequestLocationInformation        ECID-RequestLocationInformation
            OPTIONAL, -- Need ON
        epdu-RequestLocationInformation        EPDU-Sequence
                                               OPTIONAL,  -- Need ON
        wlan-bt-RequestLocationInformation     WLAN-BT-
RequestLocationInformations                    OPTIONAL,  -- Need ON
        barometric-RequestLocationInformation  BAROMETRIC-
RequestLocationInformation                     OPTIONAL,  -- Need ON
        ...
}
RequestLocationInformation-r13-IEs ::= SEQUENCE {
        wlan-bt-RequestLocationInformation     WLAN-BT-
RequestLocationInformation                     OPTIONAL,  -- Need ON
        barometric-RequestLocationInformation  BAROMETRIC-
RequestLocationInformation                     OPTIONAL,  -- Need ON
}
-- ASN1STOP
```

The Request Location Information R9 compatible Information Element (IE) includes request for location information from the UE 102, such as assisted GNSS (A-GNSS) information, observed time difference of arrival (OTDOA) information, enhanced cell identifier (ECID) information, wireless local area network (WLAN) and Bluetooth (BT) (which can also refer to WPAN) information, and barometric information. The Request Location Information R13 IE includes wireless local area network (WLAN) and Bluetooth (BT) (which can also refer to WPAN) information, and barometric information.

In some embodiments, the WLAN-BT-RequestLocationInformation and Barometric-RequestLocationInformation information elements (IEs) can include the following elements as part of a structured formatted message:

```
--ASN1START
WLAN-BT-RequestLocationInformation ::= SEQUENCE {
    AssistanceAvailability     BOOLEAN,
    ...
``` tion from the wireless network, e.g., from the E-SMLC 114. The Barometric-RequestLocationInformation field can include a Boolean value that indicates whether the target wireless communication device, e.g., the UE 102, can request additional barometric assistance information, e.g., reference barometric data, from the wireless network. e.g., from the E-SMLC 114.

In some embodiments, a provide location information message sent by the UE 102 to the wireless network, to the E-SMLC 114 of the E-UTRA wireless communication system 100, which can be part of an LTE/LTE-A wireless network, can be formatted in accordance with the following structure as part of a Release 13 (R13) 3GPP wireless communication protocol and/or to be backward-compatible to a Release 9 (R9) 3GPP wireless communication protocol (or for one or more intervening 3GPP Release 10 (R10), Release 11 (R11), or Release 12 (R12) 3GPP wireless communication protocols). In some embodiments, an example structure for a Provide Location Information message, both in an R13 form and in a backward compatible R9 form, includes:

```
-- ASN1START
ProvideLocationInformation ::= SEQUENCE {
    criticalExtensions       CHOICE {
        c1              CHOICE {
            provideLocationInformation-r9    ProvideLocationInformation-r9-IEs,
            provideLocationInformation-r13   ProvideLocationInformation-r13-IEs,
            spare3 NULL, spare2 NULL, spare1 NULL
        },
        criticalExtensionsFuture SEQUENCE { }
    }
}
ProvideLocationInformation-r9-IEs ::= SEQUENCE {
    commonIEsProvideLocationInformation
            CommonIEsProvideLocationInformation    OPTIONAL,
    a-gnss-ProvideLocationInformation
            A-GNSS-ProvideLocationInformation      OPTIONAL,
    otdoa-ProvideLocationInformation
            OTDOA-ProvideLocationInformation       OPTIONAL,
    ecid-ProvideLocationInformation
            ECID-ProvideLocationInformation        OPTIONAL,
    epdu-ProvideLocationInformation
            EPDU-Sequence                          OPTIONAL,
    wlan-bt-ProvideLocationInformation
            WLAN-BT-ProvideLocationInformation     OPTIONAL,
    barometric-ProvideLocationInformation
            BAROMETRIC-ProvideLocationInformation  OPTIONAL,
    ...
}
ProvideLocationInformation-r13-IEs ::= SEQUENCE {
    wlan-bt-ProvideLocationInformation
        WLAN-BT-ProvideLocationInformation         OPTIONAL,
    barometric-ProvideLocationInformation
        BAROMETRIC-ProvideLocationInformation      OPTIONAL,
}
-- ASN1STOP
```

-continued

```
}
BAROMETRIC-RequestLocationInformation ::= SEQUENCE {
    CalibrationAsistanceAvailability     BOOLEAN,
    ...
}
-- ASN1STOP
```

The WLAN-BT-RequestLocationInformation field can include a Boolean value that indicates whether a target wireless communication device, e.g., the UE 102, can request additional WLAN/WPAN (BT) assistance informa- The Provide Location Information R9 compatible Information Element (IE) includes fields for location information provided by the UE 102, such as assisted GNSS (A-GNSS) information, observed time difference of arrival (OTDOA) information, enhanced cell identifier (ECID) information, wireless local area network (WLAN) and Bluetooth (BT) (which can also refer to WPAN) information, and barometric information. The Provide Location Information R13 IE includes wireless local area network (WLAN) and Bluetooth (BT) (which can also refer to WPAN) information, and barometric information that can be provided by the UE 102.

In some embodiments, the WLAN-BT-ProvideLocation-Information and Barometric-ProvideLocationInformation information elements (IEs) can include the following elements as part of a structured formatted message:

```
---ASN1START
WLAN-BT-ProvideLocationInformation ::= SEQUENCE {
    WLAN-BT-Location BOOLEAN,
// indication that location estimation done through indoor WLAN-BT
...
}
BAROMETRIC-ProvideLocationInformation ::= SEQUENCE {
Barometric_location BOOLEAN,
... // indication that vertical location estimation done through
barometric sensors
}
-- ASN1STOP
```

The WLAN-BT-ProvideLocationInformation IE can include a Boolean value that indicates whether location estimation is performed by the UE 102 using WLAN AP and/or WPAN (BT) information. The Barometric-ProvideLocationInformation IE can include a Boolean value that indicates whether vertical location estimation by the UE 102 uses barometric information, such as from a barometric sensor in the UE 102 alone or in conjunction with barometric reference data.

In some embodiments, the UE 102 can provide to a network element, e.g., the E-SMLC 114, in response to an inquiry about the UE's capabilities, e.g., a generic inquiry about UE capabilities or a specific inquiry about UE "positioning" (location) determination (estimation) capabilities received from the network element, e.g., the E-SMLC 114. The UE 102 can indicate using messages as detailed hereinabove whether it supports a mode in which the UE 102 can use WLAN/WPAN AP information as part of a procedure for estimating the UE's location. The capabilities information provided by the UE 102 to the E-SMLC 114 can include an indication that the UE 102 supports one of: a "network-based" estimation of the UE's location based at least in part on WLAN/WPAN AP information, a "UE-based" estimation of the UE's location based at least in part on WLAN/WPAN AP information, both a "network-based" estimation and a "UE-based" estimation of the UE's location based at least in part on WLAN/WPAN AP information, and no support for UE location estimation based on at least in part on WLAN/WPAN AP information. In some embodiments, one or more network elements, e.g., the E-SMLC 114, determine whether to perform location estimation of the UE 102 based on information provided by the UE 102 in messages that indicates WLAN/WPAN and/or barometric sensor capabilities of the UE 102 for location estimation, e.g., communicated as part of a UE capabilities message, sent in response to a UE capabilities inquiry sent from the E-SMLC 114 to the UE 102. In some embodiments, one or more network elements, e.g., the E-SMLC 114, provide WLAN/WPAN AP information to the UE 102 conditionally based on whether the UE 102 supports a mode for UE location estimation using at least in part WLAN AP information.

In some embodiments, the UE 102 can include an indication that the UE 102 supports one of: a "network-based" estimation of the UE's location based at least in part on a combination of WLAN/WPAN AP information and GPS/GNSS information, a "UE-based" estimation of the UE's location based at least in part on a combination of WLAN/WPAN AP information and GPS/GNSS information, both a "network-based" estimation and a "UE-based" estimation of the UE's location based at least in part on a combination of WLAN/WPAN AP information and GPS/GNSS information, and no support for UE location estimation based on at least in part on a combination of WLAN/WPAN AP information and GPS/GNSS information. In some embodiments, one or more network elements, e.g., the E-SMLC 114, determine whether to perform location estimation of the UE 102 based on information provided by the UE 102, e.g., communicated as part of a UE capabilities message, sent in response to a UE capabilities inquiry sent from the E-SMLC 114 to the UE 102. In some embodiments, one or more network elements, e.g., the E-SMLC 114, provide WLAN/WPAN AP information to the UE 102 conditionally based at least in part on whether the UE 102 supports a mode for UE location estimation using at least in part WLAN/WPAN AP information. For example, the E-SMLC 114 can provide information to the UE 102 to assist in gathering and/or processing WLAN/WPAN AP information for estimating a location of the UE 102.

In some embodiments, the UE 102 can indicate capabilities to use barometric information, for example the Provide Capabilities response sent by the UE 102 to the E-SMLC 114 (or another applicable network element) can include an indication that the UE 102 supports one of: a "network-based" estimation of the UE's location based at least in part on barometric information, a "UE-based" estimation of the UE's location based at least in part on barometric information, both a "network-based" estimation and a "UE-based" estimation of the UE's location based at least in part on barometric information, and no support for UE location estimation based on at least in part on barometric information. In some embodiments, the UE capability information can indicate the presence and/or functional status of one or more sensors that can be used to estimate and/or provide information for estimating a "vertical" location of the UE 102, such as from a barometric sensor. In some embodiments, one or more network elements, e.g., the E-SMLC 114, determine whether to perform "vertical" location estimation of the UE 102 based on information provided by the UE 102, e.g., communicated as part of a UE capabilities message, sent in response to a UE capabilities inquiry sent from the E-SMLC 114 to the UE 102. In some embodiments, one or more network elements, e.g., the E-SMLC 114, provide barometric reference data to the UE 102 conditionally based on whether the UE 102 supports a mode for UE location estimation using at least in part barometric information.

In some embodiments, one or more network elements, e.g., the E-SMLC 114, can provide WLAN/WPAN assistance information to the UE 102 using one or more information elements of one or more "Provide Assistance Data" messages. In addition, the one or more network elements can also provide barometric reference data, such as mean sea level pressure (MSLP) values for the UE 102 to use in conjunction with measured barometric sensor information to estimate a "vertical" location of the UE 102. The UE Positioning WLAN/WPAN/Barometric Assistance Data can include a list of preferred WLAN/WPAN access points for the UE 102 to use when operating in a WLAN/WPAN mode to support UE location estimation based at least in part on WLAN/WPAN AP information, or in a Hybrid WLAN/WPAN mode to support UE location estimation based at least in part on a combination of WLAN/WPAN AP information and GPS/GNSS information. The E-SMLC 114 can provide information about each WLAN/WPAN AP in a list, including but not limited to one or more of: a service set identifier (SSID), a basic service set identifier (BSSID), an extended service set identifier (ESSIS), a homogeneous service set identifier (HSSID), a homogeneous extended service set identifier (HeSSID), one or more frequency bands, and one or more frequency channels (e.g., within a frequency band). In some embodiments, the UE 102 uses information provided by the E-SMLC 114 to determine a set of WLAN APs to measure and report measurement data and/or location estimation back to the E-SMLC 114 based on the measurement results obtained.

In some embodiments, one or more network elements, e.g., the E-SMLC 114, can provide "Barometric Reference Data" to the UE 102, which can include barometric reference data information that can be used by the UE 102 in conjunction with barometric sensor information to estimate a "vertical" location of the UE 102. In some embodiments, the barometric reference data include one or more mean sea level pressure (MSLP) values that can provide a reference point by which barometric sensor information measured by a barometric sensor in the UE 102 can be used to estimate the "vertical" location of the UE 102. In some embodiments, the UE 102 uses information obtained from Barometric Reference Data provided by the wireless network to calibrate location estimation in the UE 102 based on barometric sensor data measured by a barometric sensor in the UE 102. In some embodiments, an estimated "vertical" location of the UE can include an absolute estimate, e.g., in feet, meters, or another standard measurement unit above sea level. In some embodiments, the estimated "vertical" location of the UE can include a relative estimate, e.g., an indication of "ground" level or "first floor" or another recognizable relative indication of a "vertical" location of the UE 102.

Figure 2B:
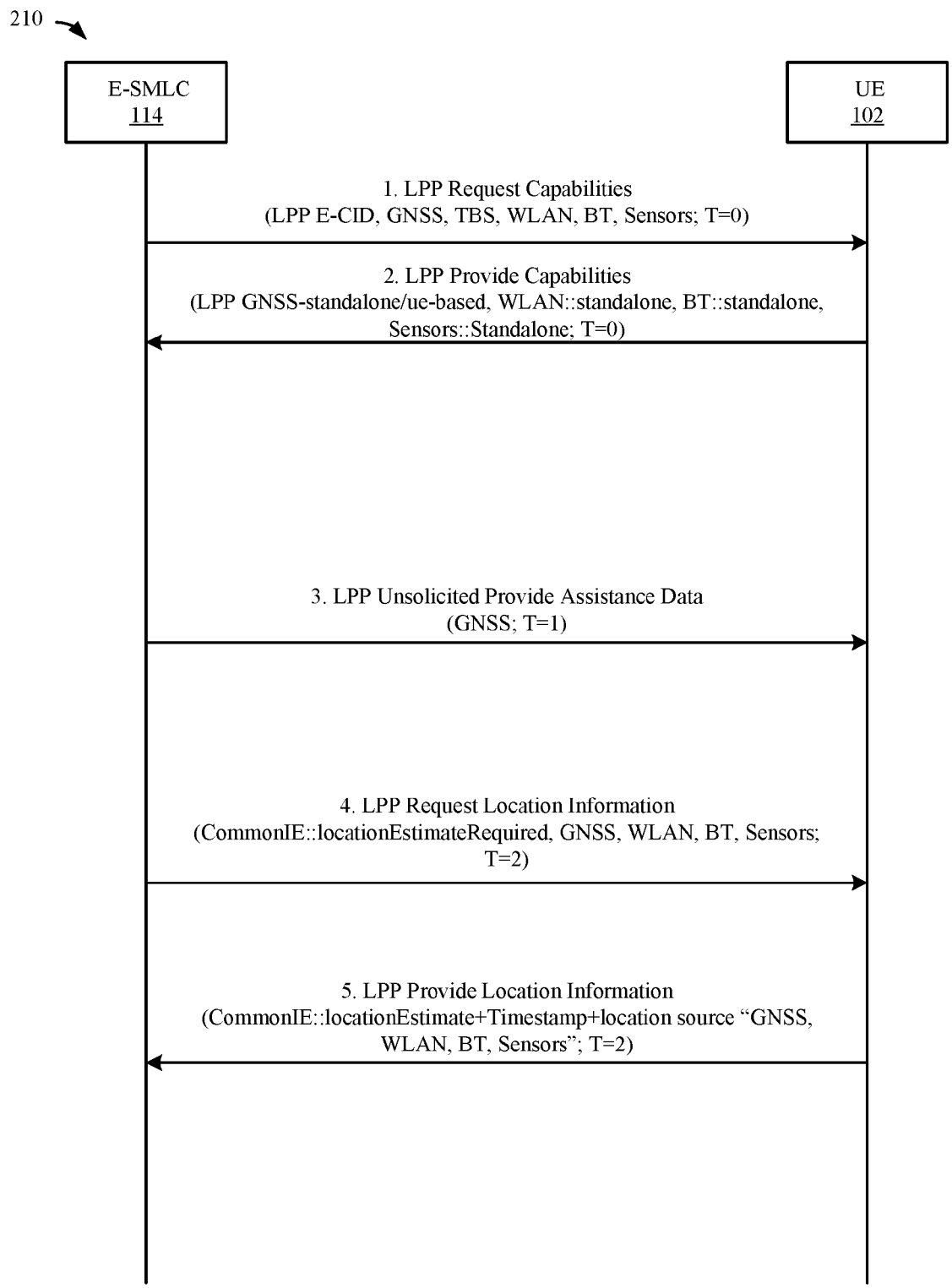
FIG. 2B illustrates a diagram of an exemplary exchange of messages between a UE and network elements of an LTE wireless network as part of an emergency services location determination call flow, in accordance with some embodiments.

FIG. 2B illustrates a diagram 210 of an exemplary exchange of messages between a UE 102 and network elements of an LTE wireless network, e.g., an E-SMLC 114 of the E-UTRA wireless communication system 100, as part of an emergency services location determination call flow. In a first step, the E-SMLC 114 sends a message to the UE 102 inquiring about capabilities of the UE 102. The UE capability inquiry can be part of an LPP Request Capabilities message sent to the UE 102 by the E-SMLC 114. The LPP Request Capabilities Message can include a request for general or specific UE capabilities, such as location estimation capabilities that the UE 102 can provide. The LPP Request Capabilities Message can include one or more of: (i) an inquiry for an Enhanced Cell ID (E-CID), (ii) an inquiry about GPS/GNSS location estimation capabilities of the UE 102, (iii) an inquiry about Terrestrial Beacon Systems (TBS) location estimation capabilities of the UE 102, (iv) an inquiry about WLAN location estimation capabilities of the UE 102, (v) an inquiry about WPAN (e.g., Bluetooth) location estimation capabilities of the UE 102, (vi) an inquiry about barometric sensors (or other sensors) location estimation capabilities of the UE 102. In a second step, the UE 102 can respond to the LPP Request Capabilities message from the E-SMLC 114 by providing UE capability information, e.g., in an LPP Provide Capabilities message sent to the E-SMLC 114. The UE capability information provided to the E-SMLC 114 can include whether the UE 102 can perform location estimation using a GPS/GNSS capability, including stand-alone or UE-based with additional assistance or another enumerated form of GPS/GNSS location determination alone or in conjunction with information provided by network elements. In some embodiments, the UE capability information provided to the E-SMLC 114 can include whether the UE 102 can perform location estimation based on one or more of: GPS, GNSS, A-GPS, A-GNSS, WLAN, WPAN, or Sensor(s). In some embodiments, the UE capability information can include whether the UE 102 can perform location estimation in a "stand-alone" manner using one or more of the capabilities and/or in a cooperative "assisted" manner with one or more network elements. In some embodiments, the request for UE capabilities and the response to provide UE capabilities occurs upon power up, at attachment to a network element, during a location update, when associating with a cell of a wireless network, when switching cells, and/or during handover between wireless network cells.

In a third step, as shown in FIG. 2B, subsequent to the LPP Request Capabilities and LPP Provide Capabilities message exchange, (which can occur at a time separated from the third step), the E-SMLC 114 can provide unsolicited LPP Assistance Data to the UE 102, e.g., for use as part of GPS/GNSS and/or assisted GPS/GNSS location estimation.

In a fourth step, as shown in FIG. 2B, subsequent to the LPP Unsolicited Provide Assistance Data message, (which can occur at a time separated from the fourth and fifth steps), the E-SMLC 114 can request location estimation information from the UE 102, by sending an LPP Request Location Information message to the UE 102. The request for location estimation information from the UE 102 can include a request for a location estimated by the UE 102 (a UE-based estimate), a request for a location estimated by the UE 102 and additional location information with which the E-SMLC 114 (and/or one or more other network elements) can estimate a location of the UE 102 (a UE-assisted estimate), and/or a request for location information that can be used by one or more network elements to estimate a location of the UE 102 (a network-based estimate). In some embodiments, the request for location information includes a request for GPS/GNSS information, WLAN information, WPAN (e.g., Bluetooth) information, and/or sensor (e.g., barometric sensor) information.

In a fifth step, the UE 102 can provide location information to the E-SMLC 114 by sending an LPP Provide Location Information message. The provided location information can include a location estimate generated by the UE 102, a time stamp associated with the location estimate, and information about how the location estimate was generate, e.g., one or more sources of data used to generate the location estimate, e.g., GPS/GNSS, WLAN, WPAN, Sensors, etc. In some embodiments, the UE 102 uses multiple sources of information to generate the location estimate and indicates as such to the E-SMLC 114. In some embodiments, multiple location estimates based on different estimation methods are provided, each indicating a different source (or set of sources used).

For the message exchanges illustrated in FIGS. 2A and 2B, various formatted messages can be used as detailed herein and/or as listed further below regarding changes to proposed 3GPP technical specifications.

Message Body Information Elements (IEs)

In some embodiments, a network element, such as the E-SMLC 114 or a location server, sends to the UE 102 a RequestCapabilities message body in an LPP message to request capability information for LPP and to request supported individual positioning methods from the UE 102. In some embodiments, the RequestCapabilities message body can include the following elements as part of a structured formatted message:

```
-- ASN1START
RequestCapabilities ::= SEQUENCE {
criticalExtensions          CHOICE {
    c1                CHOICE {
        requestCapabilities-r9        RequestCapabilities-r9-IEs,
        spare3 NULL, spare2 NULL, spare1 NULL
    },
    criticalExtensionsFuture SEQUENCE { }
}
}
RequestCapabilities-r9-IEs ::= SEQUENCE {
commonIEsRequestCapabilities        CommonIEsRequestCapabilities
OPTIONAL, -- Need ON
a-gnss-RequestCapabilities          A-GNSS-RequestCapabilities
OPTIONAL, -- Need ON
otdoa-RequestCapabilities           OTDOA-RequestCapabilities
OPTIONAL, -- Need ON
ecid-RequestCapabilities            ECID-RequestCapabilities
OPTIONAL, -- Need ON
epdu-RequestCapabilities            EPDU-Sequence
OPTIONAL, -- Need ON
...,
sensors-RequestCapabilities         Sensors-RequestCapabilites
OPTIONAL, -- Need ON
wlan-RequestCapabilities            WLAN-RequestCapabilites
OPTIONAL, -- Need ON
bt-RequestCapabilities              BT-RequestCapabilites
OPTIONAL, -- Need ON
}
-- ASN1STOP
```

In some embodiments, the UE 102 responds to a request for LPP capabilities by sending to the requester, such as to the E-SMLC 114 or to a location server, a ProvideCapabilities message body in an LPP message to indicate LPP capabilities of the UE 102 to the requester. In some embodiments, the ProvideCapabilities message body can include the following elements as part of a structured formatted message:

```
-- ASN1START
ProvideCapabilities ::= SEQUENCE {
criticalExtensions          CHOICE {
    c1                CHOICE {
        provideCapabilities-r9        ProvideCapabilities-r9-IEs,
        spare3 NULL, spare2 NULL, spare1 NULL
    },
    criticalExtensionsFuture SEQUENCE { }
}
}
ProvideCapabilities-r9-IEs ::= SEQUENCE {
commonIEsProvideCapabilities        CommonIEsProvideCapabilities
OPTIONAL,
a-gnss-ProvideCapabilities          A-GNSS-ProvideCapabilities
OPTIONAL,
otdoa-ProvideCapabilities           OTDOA-ProvideCapabilities
OPTIONAL,
ecid-ProvideCapabilities            ECID-ProvideCapabilities
OPTIONAL,
epdu-ProvideCapabilities            EPDU-Sequence
OPTIONAL,
...,
sensors-ProvideCapabilities         Sensors-ProvideCapabilites
OPTIONAL,
wlan-ProvideCapabilities            WLAN-ProvideCapabilites
OPTIONAL,
bt-ProvideCapabilities              BT-ProvideCapabilites
OPTIONAL,
}
-- ASN1STOP
```

In some embodiments, the UE 102 requests assistance data for location estimation from a network element, such as from the E-SMLC 114 or a location server, by sending a RequestAssistanceData message body in an LPP message. In some embodiments, the RequestAssistanceData message body can include the following elements as part of a structured formatted message:

```
-- ASN1START
RequestAssistanceData ::= SEQUENCE {
criticalExtensions          CHOICE {
    c1                CHOICE {
        requestAssistanceData-r9        RequestAssistanceData-r9-IEs,
        spare3 NULL, spare2 NULL, spare1 NULL
    },
    criticalExtensionsFuture SEQUENCE { }
}
}
RequestAssistanceData-r9-IEs ::= SEQUENCE {
commonIEsRequestAssistanceData        CommonIEsRequestAssistanceData
OPTIONAL,
a-gnss-RequestAssistanceData          A-GNSS-RequestAssistanceData
OPTIONAL,
otdoa-RequestAssistanceData           OTDOA-RequestAssistanceData
OPTIONAL,
epdu-RequestAssistanceData            EPDU-Sequence
OPTIONAL,
...
}
-- ASN1STOP
```

In some embodiments, a network element, such as the E-SMLC 114 or a location server, responds to the request for assistance data for location estimation received from the UE 102 by sending a ProvideAssistanceData message body in an LPP message. In some embodiments, the network element sends the ProvideAssistanceData message body in an LPP message to the UE 102 in an unsolicited manner. In some embodiments, the ProvideAssistanceData message body can include the following elements as part of a structured formatted message:

```
-- ASN1START
ProvideAssistanceData ::= SEQUENCE {
criticalExtensions          CHOICE {
    c1                  CHOICE {
        provideAssistanceData-r9    ProvideAssistanceData-r9-IEs,
        spare3 NULL, spare2 NULL, spare1 NULL
    },
    criticalExtensionsFuture SEQUENCE { }
}
}
ProvideAssistanceData-r9-IEs ::= SEQUENCE {
commonIEsProvideAssistanceData              CommonIEsProvideAssistanceData
OPTIONAL,  -- Need ON
a-gnss-ProvideAssistanceData                A-GNSS-ProvideAssistanceData
OPTIONAL,  -- Need ON
otdoa-ProvideAssistanceData                 OTDOA-ProvideAssistanceData
OPTIONAL,  -- Need ON
epdu-Provide-Assistance-Data                EPDU-Sequence
OPTIONAL,  -- Need ON
...
}
-- ASN1STOP
```

In some embodiments, a network element, such as the E-SMLC 114 or a location server, sends to the UE 102 a RequestLocationInformation message body in an LPP message to request positioning measurements or a position estimate from the UE 102. In some embodiments, the RequestLocationInformation message body can include the following elements as part of a structured formatted message:

```
-- ASN1START
RequestLocationInformation ::= SEQUENCE {
criticalExtensions          CHOICE {
    c1                  CHOICE {
        requestLocationInformation-r9RequestLocationInformation-r9-IEs,
        spare3 NULL, spare2 NULL, spare1 NULL
    },
    criticalExtensionsFuture SEQUENCE { }
}
}
RequestLocationInformation-r9-IEs ::= SEQUENCE {
commonIEsRequestLocationInformation
                CommonIEsRequestLocationInformation
OPTIONAL,  -- Need ON
a-gnss-RequestLocationInformation       A-GNSS-RequestLocationInformation
OPTIONAL,  -- Need ON
otdoa-RequestLocationInformation        OTDOA-RequestLocationInformation
OPTIONAL,  -- Need ON
ecid-RequestLocationInformation         ECID-RequestLocationInformation
OPTIONAL,  -- Need ON
epdu-RequestLocationInformation         EPDU-Sequence
OPTIONAL,  -- Need ON
...,
sensors-RequestLocationInformation      Sensors-RequestLocationInformation
OPTIONAL,  -- Need ON
wlan-RequestLocationInformation         WLAN-RequestLocationInformation
OPTIONAL,  -- Need ON
bt-RequestLocationInformation           BT-RequestLocationInformation
OPTIONAL,  -- Need ON
}
-- ASN1STOP
```

The "commonIEsRequestLocationInformation" field in the RequestLocationInformation message body can specify location information types requested by the network element, e.g., the E-SMLC 114 or a location server, and can also include configuration information associated with the requested location information.

In some embodiments, the UE 102 responds to a request for location information by sending to the requester, such as to the E-SMLC 114 or to a location server, a ProvideLocationInformation message body in an LPP message to provide positioning measurements and/or position estimates to the requester, e.g., to the E-SMLC 114 or to the location server. In some embodiments, the ProvideLocationInformation message body can include the following elements as part of a structured formatted message:

```
-- ASN1START
ProvideLocationInformation ::= SEQUENCE {
    criticalExtensions          CHOICE {
        c1              CHOICE {
            provideLocationInformation-r9 ProvideLocationInformation-r9-IEs,
            spare3 NULL, spare2 NULL, spare1 NULL
        },
        criticalExtensionsFuture SEQUENCE { }
    }
}
ProvideLocationInformation-r9-IEs ::= SEQUENCE {
    commonIEsProvideLocationInformation         CommonIEsProvideLocationInformation     OPTIONAL,
    a-gnss-ProvideLocationInformation           A-GNSS-ProvideLocationInformation       OPTIONAL,
    otdoa-ProvideLocationInformation            OTDOA-ProvideLocationInformation        OPTIONAL,
    ecid-ProvideLocationInformation             ECID-ProvideLocationInformation         OPTIONAL,
    epdu-ProvideLocationInformation             EPDU-Sequence                           OPTIONAL,
    ...,
    sensors-ProvideLocationInformation          Sensors-ProvideLocationInformation      OPTIONAL,
    wlan-ProvideLocationInformation             WLAN-ProvideLocationInformation         OPTIONAL,
    bt-ProvideLocationInformation               BT-ProvideLocationInformation           OPTIONAL,
}
-- ASN1STOP
```

Common Positioning

In some embodiments, one or more LPP messages include a CommonIEsProvideLocationInformation message body, which carries common IEs for a Provide Location Information LPP message type. In some embodiments, the CommonIEsProvideLocationInformation message body can include the following elements as part of a structured formatted message:

```
-- ASN1START
CommonIEsProvideLocationInformation ::= SEQUENCE {
    locationEstimate            LocationCoordinates         OPTIONAL,
    velocityEstimate            Velocity                    OPTIONAL,
    locationError               LocationError               OPTIONAL,
    ...,
    [[ earlyFixReport-r12       EarlyFixReport-r12          OPTIONAL
    ]],
    [[ locationInfo             locationInfo                OPTIONAL
    ]],
}
LocationCoordinates ::= CHOICE {
    ellipsoidPoint                                          Ellipsoid-Point,
    ellipsoidPointWithUncertaintyCircle                     Ellipsoid-PointWithUncertaintyCircle,
    ellipsoidPointWithUncertaintyEllipse                    EllipsoidPointWithUncertaintyEllipse,
    polygon                                                 Polygon,
    ellipsoidPointWithAltitude                              EllipsoidPointWithAltitude,
    ellipsoidPointWithAltitudeAndUncertaintyEllipsoid       EllipsoidPointWithAltitudeAndUncertaintyEllipsoid,
    ellipsoidArc                                            EllipsoidArc,
    ...
}
Velocity ::= CHOICE {
    horizontalVelocity                                      HorizontalVelocity,
```

```
horizontalWithVerticalVelocity
HorizontalWithVerticalVelocity,
horizontalVelocityWithUncertainty
HorizontalVelocityWithUncertainty,
horizontalWithVerticalVelocityAndUncertainty
HorizontalWithVerticalVelocityAndUncertainty,
...
}
LocationError ::= SEQUENCE {
locationfailurecause          LocationFailureCause,
...
}
LocationFailureCause ::= ENUMERATED {
undefined,
requestedMethodNotSupported,
positionMethodFailure,
periodicLocationMeasurementsNotAvailable,
...
}
EarlyFixReport-r12 ::= ENUMERATED {
noMoreMessages,
moreMessagesOnTheWay
}
LocationInfo ::= SEQUENCE {
    locationSource      LocationSource              OPTIONAL,
    locationTimeStamp   LocationTimeStamp           OPTIONAL,
    ...
}
LocationSource ::= BIT STRING { gnss          (0),
                                otdoa         (1),
                                ecid          (2),
                                WLAN          (3),
                                BT            (4),
                                Sensors       (5) } (SIZE(1..16))
LocationReferenceTime VisibleString (SIZE (14))
-- ASN1STOP
```

In some embodiments, the "locationEstimate" field provides a location estimate using one of the geographic shapes defined in 3GPP TS 23.032 [Reference 15], which is incorporated by reference herein in its entirety for all purposes. Coding of the values of the various fields internal to each geographic shape can follow the rules in [Reference 15]. The conditions for including this field can be defined for the locationInformationType field in a Request Location Information message.

In some embodiments, the "velocityEstimate" field provides a velocity estimate using one of the velocity shapes defined in 3GPP TS 23.032 [Reference 15]. Coding of the values of the various fields internal to each velocity shape follow the rules in [Reference 15].

In some embodiments, the "locationError" field is included if and only if a location estimate and measurements are not included in the LPP PDU. The field can include information concerning the reason for the lack of location information. The LocationFailureCause 'periodicLocationMeasurementsNotAvailable' can used by the UE 102 when periodic location reporting is requested, but no measurements or location estimate are available when the reportingInterval expires.

In some embodiments, the "earlyFixReport" field is included if and only if the ProvideLocationInformation message contains early location measurements or an early location estimate. The UE 102 can set values of this field as follows:
  noMoreMessages: This value can be used when only one ProvideLocationInformation message or when a final ProvideLocationInformation message is used to deliver the entire set of early location information.
  moreMessagesOnTheWay: This value can be used for one of multiple ProvideLocationInformation messages used to deliver the entire set of early location information (such as when early location information will not fit into a single message).

In some embodiments, the "LocationSource" field includes information concerning sources for the "locationEstimate" field.

In some embodiments, the "LocationReferenceTime" field provides a coordinated universal time (UTC) value indicating when a location estimate was performed. The UTC value can be formatted as yyyyMMddhhmmss, wherein yyyy indicates Year, MM indicates Month, dd indicates Day, hh indicates Hours, mm indicates Minutes, and ss indicates Seconds.

WLAN-Based Positioning

In some embodiments, the UE 102 provides WLAN measurements to one or more network elements, e.g., to the E-SMLC 114 or a location server, in response to a request for location information using a WLAN-ProvideLocationInformation information element. In some embodiments, the WLAN-ProvideLocationInformation information element can include the following as part of a structured formatted message:

```
-- ASN1START
WLAN-ProvideLocationInformation ::= SEQUENCE {
wlan-MeasurementInformation      WLAN-MeasurementInformation
OPTIONAL,
wlan-Error                       WLAN-Error
OPTIONAL,
...
}
-- ASN1STOP
```

In some embodiments, the UE 102 provides the WLAN measurements to one or more network elements, e.g., to the E-SMLC 114 or a location server, in response to a request for location information using a WLAN-MeasurementInformation information element. In some embodiments, the WLAN-MeasurementInformation information element can include the following as part of a structured formatted message:

```
-- ASN1START
WLAN-MeasurementInformation      ::= SEQUENCE {
wlan-MeasuredResultsList              WLAN-MeasuredResultsList,
locationReferencetime                 LocationReferencetime
OPTIONAL,
...
}
MeasuredResultsList ::= SEQUENCE (SIZE(1..32)) OF WLAN-
MeasuredResultsElement
WLAN-MeasuredResultsElement ::= SEQUENCE {
wlan-AP-Identifier                    WLAN-AP-Identifier,
wlan-RSSI                       INTEGER (-127..128)    OPTIONAL,
wlan-RTT                     WLAN-RTT-Info       OPTIONAL,
...
}
WLAN-AP-Identifier   ::=           SEQUENCE {
Bssid                      BIT STRING (SIZE (48)),
Ssid                       OCTET STRING (SIZE (1..32))
OPTIONAL,
...
}
WLAN-RTT-Info         ::= SEQUENCE {
rttValue             INTEGER (0..16777215),
    rttUnits              ENUMERATED { microseconds,
                             hundredsofnanoseconds,
                             tensofnanoseconds,
                             nanoseconds,
                             tenthsofnanoseconds,
                             ... },
rttAccuracy         INTEGER (0..255)                OPTIONAL,
    ...}
-- ASN1STOP
```

In some embodiments, the "locationReferencetime" field specifies a time when WLAN measurements were made. In some embodiments, the UE 102 includes this field if it was able to determine the time of measurement.

In some embodiments, the "wlan-MeasuredResultsList" field includes WLAN measurements for a number of different access points, e.g., up to 32 different WLAN APs.

In some embodiments, the "wlan-AP-Identifier" field specifies an identity for a measured WLAN AP.

In some embodiments, the "wlan-RTT" field specifies a Round Trip Time (RTT) measurement between the UE 102 and a WLAN AP.

In some embodiments, the "bssid" field provides the Basic Service Set Identifier (BSSID) [Reference 24] of a measured WLAN AP (which can be identical to a MAC address of the WLAN AP).

In some embodiments, the "ssid" field provides the Service Set Identifier (SSID) [Reference 24] of a wireless network served by a WLAN AP.

In some embodiments, the "rttValue" specifies a Round Trip Time (RTT) measurement between the UE 102 and a WLAN AP in units given by the field rttUnits.

In some embodiments, the "rttUnits" field specifies the Units for the fields rttValue and rttAccuracy. In some embodiments, available Units can include 1000 ns, 100 ns, 10 ns, 1 ns or 0.1 ns.

In some embodiments, the "rttAccuracy" field provides an estimated accuracy of the provided rttValue expressed as a standard deviation in units given by the field rttUnits.

In some embodiments, a network element, such as the E-SMLC 114 or a location server, includes a WLAN-RequestLocationInformation information element in an LPP message, e to request WLAN location measurements from the UE 102. In some embodiments, the WLAN-RequestLocationInformation information element is formatted as follows:

```
-- ASN1START
    WLAN-RequestLocationInformation ::= SEQUENCE {
```

-continued

```
requestedMeasurements    BIT STRING {   rssiReq   (0),
                                    ttiReq   (1)   } (SIZE(1..8)),
OPTIONAL,
...
}
-- ASN1STOP
```

In some embodiments, the WLAN-RequestLocationInformation information element includes a "requestedMeasurements" field that specifies WLAN measurements requested in a UE-assisted mode of location estimation. In some embodiments, the "requestedMeasurements" field is represented by a bit string, with a one-value at a bit position to indicate a particular measurement that is requested, and with a zero-value at a bit position to indicate a particular measurement is not requested. Different bit positions can correspond to different particular measurements.

In some embodiments, the UE 102 includes a WLAN-ProvideCapabilities information element in an LPP message sent to a network element, such as to the E-SMLC 114 or to a location server, to indicate the UE's capability to support WLAN location estimation capabilities. In some embodiments, the WLAN-ProvideCapabilities information element is formatted as follows:

```
-- ASN1START
WLAN-ProvideCapabilities ::= SEQUENCE {
wlan-Modes              PositioningModes,
wlan-MeasSupported      BIT STRING {  rssiSup  (0),
                              rttSup  (1)  } (SIZE(1..8)), OPTIONAL,
                        --
Cond modes
...
}
-- ASN1STOP
```

In some embodiments, the WLAN-ProvideCapabilities information element includes a wlan-Modes field that specifies WLAN mode(s) supported by the UE 102. In some embodiments, the wlan-Modes field is represented by a bit string, with a one-value at a bit position indicating a particular WLAN mode is supported and a zero-value at a bit position indicating a particular WLAN mode is not supported. Different bit positions can correspond to different particular WLAN modes.

In some embodiments, the WLAN-ProvideCapabilities information element includes a wlan-MeasSupported field that specifies whether the UE 102 is capable of performing rssi and/or round trip time measurements. In some embodiments, the wlan-MeasSupported field is represented by a bit string with a one-value at a bit position indicating a particular measurement is supported and a zero-value indicating a particular measurement is not supported. The wlan-MeasSupported field can be included when the UE 102 supports a UE-assisted mode and can otherwise be not present.

In some embodiments, the RequestCapabilities message body of an LPP message sent by a network element, e.g., the E-SMLC 114 or a location server, includes a WLAN-RequestCapabilities information element to request WLAN positioning capabilities from a UE 102. In some embodiments, the WLAN-RequestCapabilities information element can be formatted as follows:

```
-- ASN1START
WLAN-ProvideCapabilities ::= SEQUENCE {
wlan-Modes    PositioningModes,
wlan-MeasSupported BIT STRING { rssiSup (0),
         rttSup    (1) } (SIZE(1..8)), OPTIONAL, --
Cond modes
...
}
-- ASN1STOP
```

In some embodiments, one or more LPP messages can include a WLAN-Error information element to indicate reasons for WLAN errors. The WLAN-Error information element can be used by a network element, e.g., the E-SMLC 114 or a location server, or by the UE 102. In some embodiments, the WLAN-Error information element can be formatted as follows:

```
-- ASN1START
WLAN-Error ::= CHOICE {
    targetDeviceErrorCauses    WLAN-TargetDeviceErrorCauses,
    ...
}
-- ASN1STOP
```

In some embodiments, a WLAN-TargetDeviceErrorCauses information element, which can be included in the WLAN-Error information element, can provide reasons for WLAN errors, such as for the UE 102 to indicate to a network element, such as the E-SMLC 114 or a location server such reasons. In some embodiments, the WLAN-TargetDeviceErrorCauses information element can be formatted as follows:

```
-- ASN1START
WLAN-TargetDeviceErrorCauses ::= SEQUENCE {
cause  ENUMERATED    { undefined,
                       requestedMeasurementNotAvailable,
                       notAllrequestedMeasurementsPossible,
                       ...
                     },
    wlan-AP-ID-MeasurementNotPossible        NULL    OPTIONAL,
    wlan-AP-RSSI-MeasurementNotPossible         NULL    OPTIONAL,
    wlan-AP-RTT-MeasurementNotPossible       NULL    OPTIONAL ...
}
-- ASN1STOP
```

In some embodiments, the WLAN-TargetDeviceErrorCauses information element includes a "cause" field that provides a WLAN specific error cause. In some embodiments, a "cause" value of 'notAllRequestedMeasurementsPossible' can indicate that the UE 102 was not able to calculate a position using WLAN or provide all requested WLAN measurements (but may be able to provide some measurements). In some embodiments, the UE 102 includes one or more of the following fields, as applicable: 'wlan-AP-ID-MeasurementNotPossible', 'wlan-AP-RSSI-MeasurementNotPossible', 'wlan-AP-RTT-MeasurementNotPossible'.

Bluetooth-Based Positioning

In some embodiments, the UE 102 provides Bluetooth (or more generally WPAN) based measurements to one or more network elements, e.g., to the E-SMLC 114 or a location server, in response to a request for location information from the UE 102 using a BT-ProvideLocationInformation information element. In some embodiments, the UE 102 operates in a UE-assisted mode to provide the Bluetooth measurements to the network element(s). In some embodiments, the BT-ProvideLocationInformation information element can include the following as part of a structured formatted message:

```
-- ASN1START
BT-ProvideLocationInformation ::= SEQUENCE {
bt-MeasurementInformation    BT-MeasurementInformation    OPTIONAL,
bt-Error       BT-Error       OPTIONAL,
...
}
-- ASN1STOP
```

In some embodiments, the UE 102 provides the BT measurements to one or more network elements, e.g., to the E-SMLC 114 or a location server, in response to a request for location information using a BT-MeasurementInformation information element, e.g., included as part of a BT-ProvideLocationInformation information element. In some embodiments, the BT-MeasurementInformation information element can include the following as part of a structured formatted message:

```
-- ASN1START
BT-MeasurementInformation ::= SEQUENCE {
bt-MeasuredResultsList       BT-MeasuredResultsList,
locationReferencetime        LocationReferencetime    OPTIONAL,
...
}
MeasuredResultsList::= SEQUENCE (SIZE(1..32)) OF BT-MeasuredResultsElement
```

```
BT-MeasuredResultsElement ::= SEQUENCE {
bt-beacon-Identifier      BT-Beacon-Identifier,
bt-RSSI                   INTEGER (-127..128)     OPTIONAL,
bt-RTT                    BT-RTT-Info             OPTIONAL,
...
}
BT-Beacon-Identifier ::=              SEQUENCE {
macAddress                BIT STRING (SIZE (48)),
...
}
BT-RTT-Info ::= SEQUENCE {
rttValue                  INTEGER (0..16777215),
     rttUnits             ENUMERATED { microseconds,
                              hundredsofnanoseconds,
                              tensofnanoseconds,
                              nanoseconds,
                              tenthsofnanoseconds,
                              ... },
rttAccuracy               INTEGER (0..255)        OPTIONAL,
...}
-- ASN1STOP
```

In some embodiments, the "bt-MeasuredResultsList" field includes Bluetooth measurements for up 32 Bluetooth beacons.

In some embodiments, the "macAddress" field specifies a MAC address for a Bluetooth beacon [Reference 25].

In some embodiments, a network element, e.g., the E-SMLC 114 or a location server, requests Bluetooth location measurements from the UE 102 using a BT-RequestLocationInformation information element sent to the UE 102, e.g., included in a RequestLocationInformation message body of an LPP message. In some embodiments, the BT-RequestLocationInformation information element can include the following as part of a structured formatted message:

```
-- ASN1START
BT-RequestLocationInformation ::= SEQUENCE {
requestedMeasurements    BIT STRING { rssiReq (0),
                                      ttiReq (1) } (SIZE(1..8)),
OPTIONAL,
}
-- ASN1STOP
```

In some embodiments, the "requestedMeasurements" field specifies BT measurements requested of the UE 102 for a UE-assisted mode. In some embodiments, the "requestedMeasurements" field is formatted as a bit string with each bit corresponding to whether a particular measured is requested. In some embodiments, a one-value at a bit position can indicate that a particular measurement is request, while a zero-value at a bit position can indicate that a particular measurement is not requested.

In some embodiments, the UE 102 includes a BT-ProvideCapabilities information element in an LPP message sent to a network element, such as to the E-SMLC 114 or to a location server, to indicate the UE's capability to support Bluetooth (or more generally WPAN) location estimation capabilities. In some embodiments, the BT-ProvideCapabilities information element is formatted as follows:

```
-- ASN1START
BT-ProvideCapabilities    ::= SEQUENCE {
bt-Modes                  PositioningModes,
bt-MeasSupported BIT STRING { rssiSup (0),
                              rttSup (1) } (SIZE(1..8)), OPTIONAL, --
Cond modes
...
}
-- ASN1STOP
```

In some embodiments, the BT-ProvideCapabilities information element includes a bt-Modes field that specifies one or more Bluetooth modes supported by the UE 102. In some embodiments, the bt-Modes field is formatted as a bit string with each bit position indicating whether a particular Bluetooth mode is supported or not supported. In some embodiments, a one-value at a bit position indicates a particular Bluetooth mode is supported, and a zero-value at a bit position indicates a particular Bluetooth mode is not supported.

In some embodiments, the BT-ProvideCapabilities information element includes a bt-MeasSupported field that specifies whether the UE 102 is capable of performing rssi and/or round trip time measurements. In some embodiments, the bt-MeasSupported field is formatted as a bit string represents this, with each bit position indicating whether a particular measurement is supported or not. In some embodiments a one-value at a bit position indicates a particular measurement is supported, and a zero-value at a bit position indicates a particular measurement is not supported. In some embodiments, this field is required to be included when the UE 102 supports a ue-assisted mode; otherwise the field can be not included.

In some embodiments, the RequestCapabilities message body of an LPP message sent by a network element, e.g., the E-SMLC 114 or a location server, includes a BT-RequestCapabilities information element to request Bluetooth (or more generally WPAN) positioning capabilities from a UE 102. In some embodiments, the BT-RequestCapabilities information element can be formatted as follows:

```
-- ASN1START
BT-RequestCapabilities ::= SEQUENCE {
...
}
-- ASN1STOP
```

In some embodiments, one or more LPP messages can include a BT-Error information element to indicate reasons for Bluetooth errors. The BT-Error information element can be used by a network element, e.g., the E-SMLC 114 or a location server, or by the UE 102. In some embodiments, the BT-Error information element can be formatted as follows:

```
-- ASN1START
BT-Error ::= CHOICE {
    targetDeviceErrorCauses     BT-TargetDeviceErrorCauses,
...
}
-- ASN1STOP
```

In some embodiments, a BT-TargetDeviceErrorCauses information element, which can be included in the BT-Error information element, can provide reasons for Bluetooth errors, such as for the UE 102 to indicate to a network element, such as the E-SMLC 114 or a location server such reasons. In some embodiments, the BT-TargetDeviceError-Causes information element can be formatted as follows:

```
-- ASN1START
BT-TargetDeviceErrorCauses ::= SEQUENCE {
cause    ENUMERATED  {  undefined,
        requestedMeasurementNotAvailable,
        notAllrequestedMeasurementsPossible,
        ...
    },
bt-Beacon-MeasurementNotPossible        NULL      OPTIONAL,
bt-Beacon-RTT-MeasurementNotPossible    NULL      OPTIONAL ...
}
-- ASN1STOP
```

In some embodiments, the BT-TargetDeviceErrorCauses information element includes a "cause" field that provides a Bluetooth specific error cause. In some embodiments, a "cause" value of 'notAllRequestedMeasurementsPossible', can indicate that the UE 102 was not able to calculate a position using Bluetooth or provide all requested Bluetooth measurements (but may be able to provide some measurements). In some embodiments, the UE 102 includes one or more of the following fields, as applicable: 'bt-Beacon-MeasurementNotPossible', 'bt-Beacon-RTT-Measurement-NotPossible'.

Barometric Pressure Sensor

In some embodiments, the UE 102 provides barometric pressure sensor measurements to one or more network elements, e.g., to the E-SMLC 114 or a location server, in response to a request for location information from the UE 102 using a Sensors-ProvideLocationInformation information element. In some embodiments, the UE 102 operates in a UE-assisted mode to provide the barometric pressure sensor measurements to the network element(s). In some embodiments, the Sensors-ProvideLocationInformation information element can include the following as part of a structured formatted message:

```
-- ASN1START
Sensors-ProvideLocationInformation ::= SEQUENCE {
sensors-MeasurementInformation    Sensors-MeasurementInformation
    OPTIONAL,
sensors-Error                     Sensors-Error
OPTIONAL,
...
}
-- ASN1STOP
```

In some embodiments, the UE 102 provides the barometric pressure sensor measurements to one or more network elements, e.g., to the E-SMLC 114 or a location server, in response to a request for location information using a Sensors-MeasurementInformation information element, e.g., included as part of a Sensors-ProvideLocationInformation information element. In some embodiments, the Sensors-MeasurementInformation information element can include the following as part of a structured formatted message:

```
-- ASN1START
Sensors-MeasurementInformation    ::= SEQUENCE {
uncompensatedBarometricPressure        INTEGER (30000..115000)
OPTIONAL,
locationReferencetime          LocationReferencetime OPTIONAL,
...
}
-- ASN1STOP
```

In some embodiments, the "uncompensatedBarometricPressure" field includes measured atmospheric pressure in units of Pascal (Pa) (corresponding to a numerical altitude resolution of about 0.1 m at sea level). In some embodiments, the "uncompensatedBarometricPressure" field is obtained from a measured atmospheric pressure output of one or more sensors of a UE 102 prior to any adjustment made externally to the sensor(s).

In some embodiments, a network element, e.g., the E-SMLC 114 or a location server, requests barometric sensor based location measurements from the UE 102 using a Sensors-RequestLocationInformation information element sent to the UE 102, e.g., included in a RequestLocationInformation message body of an LPP message. In some embodiments, the Sensors-RequestLocationInformation information element can include the following as part of a structured formatted message:

```
-- ASN1START
Sendors-RequestLocationInformation ::= SEQUENCE {
    requestedSensorsMeasurements BIT STRING { ubp (0) }
(SIZE (1..8)) OPTIONAL ...
}
-- ASN1STOP
```

In some embodiments, the "requestedSensorsMeasurements" field specifies sensor measurements requested of the UE 102. In some embodiments, the "requestedSensorsMeasurements" field is formatted as a bit string with each bit corresponding to whether a particular measurement is requested. In some embodiments, a one-value at a bit position can indicate that a particular measurement is request, while a zero-value at a bit position can indicate that a particular measurement is not requested.

In some embodiments, the UE 102 includes a Sensors-ProvideCapabilities information element in an LPP message sent to a network element, such as to the E-SMLC 114 or to a location server, to indicate the UE's capability to support Sensors and the UE's capability to provide Sensors supported modes (e.g., sensors-based location estimation capabilities). In some embodiments, the Sensors-ProvideCapabilities information element is formatted as follows:

```
Sensors-ProvideCapabilities      ::= SEQUENCE {
Sensors-Modes                    PositioningModes,
...
}
-- ASN1STOP
```

In some embodiments, the Sensors-ProvideCapabilities information element includes a Sensors-Modes field that specifies pressure sensor mode(s) supported by the UE 102. In some embodiments, the Sensors-Modes field is formatted as a bit string with each bit position indicating whether a particular Sensor mode is supported or not supported. In some embodiments, a one-value at a bit position indicates a particular Sensor mode is supported, and a zero-value at a bit position indicates a particular Sensor mode is not supported.

In some embodiments, the RequestCapabilities message body of an LPP message sent by a network element, e.g., the E-SMLC 114 or a location server, includes a Sensors-RequestCapabilities information element to request pressure sensor positioning capabilities from a UE 102. In some embodiments, the Sensors-RequestCapabilities information element can be formatted as follows:

```
-- ASN1START
Sensors-RequestCapabilities ::= SEQUENCE {
...
}
-- ASN1STOP
```

In some embodiments, one or more LPP messages can include a Sensors-Error information element to indicate reasons for pressure sensor(s) errors. The Sensors-Error information element can be used by a network element, e.g., the E-SMLC 114 or a location server, or by the UE 102. In some embodiments, the Sensors-Error information element can be formatted as follows:

```
-- ASN1START
Sensors-Error ::= CHOICE {
    targetDeviceErrorCauses    Sensors-TargetDeviceErrorCauses,
...
}
-- ASN1STOP
```

In some embodiments, a Sensors-TargetDeviceError-Causes information element, which can be included in the Sensors-Error information element, can provide reasons for pressure sensor errors, such as for the UE 102 to indicate to a network element, such as the E-SMLC 114 or a location server such reasons. In some embodiments, the Sensors-TargetDeviceErrorCauses information element can be formatted as follows:

```
-- ASN1START
Sensors-TargetDeviceErrorCauses ::= SEQUENCE {
cause    ENUMERATED    { undefined,
                         requestedMeasurementNotAvailable,
                         ...
                       },
    sensors-UBP-MeasurementNotPossible    NULL OPTIONAL,
...
}
-- ASN1STOP
```

In some embodiments, the Sensors-TargetDeviceError-Causes information element includes a "cause" field that provides a pressure sensor(s) specific error cause. In some embodiments, a "cause" value of 'requestedMeasurement-NotAvailable' can indicate that the UE 102 was not able to calculate a vertical position using pressure sensors or to provide requested pressure sensor(s) measurements. In some embodiments, the UE 102 includes "sensors-UBP-MeasurementNotPossible" fields as applicable.

Figure 3:
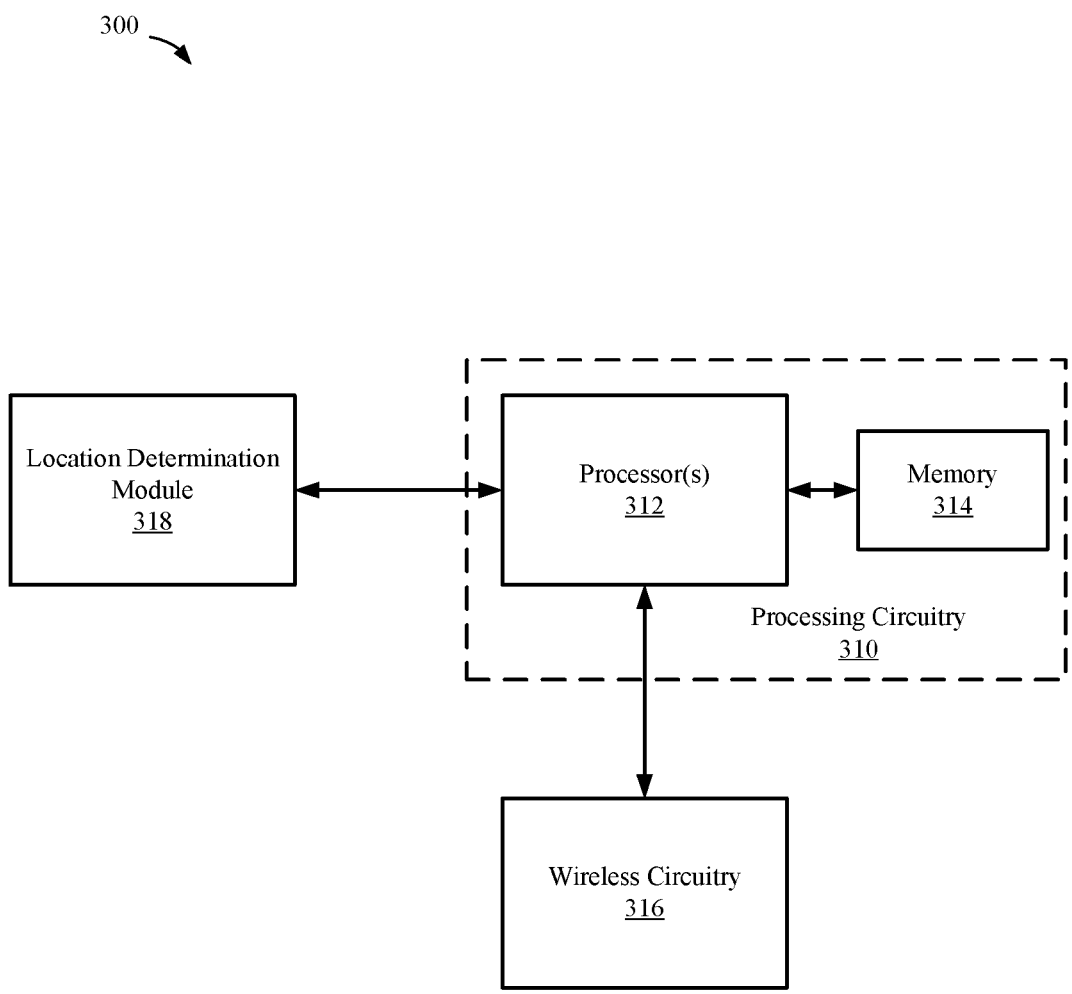
FIG. 3 illustrates a block diagram of components of a wireless communication device, such as a UE, in accordance with some embodiments.

FIG. 3 illustrates a diagram 300 of components of a wireless communication device, such as UE 102, including one or more processor(s) 312 coupled to memory 314, which together can be referred to as processing circuitry 310, wireless circuitry 316 that provides for wireless radio frequency (RF) connections between the UE 102 and various wireless networks, e.g., the wireless networks included in the E-UTRA wireless communication system 100 of FIG. 1. The UE 102 can also include a location determination module 318 configurable to operate together with the processing circuitry 310 and the wireless circuitry 316 to perform one or more operations for the UE 102 as described herein to realize location estimation (positioning determination) of the UE 102. In some embodiments, the location determination module 318 estimates a location of the UE 102 based at least in part on WLAN/WPAN AP information obtained by the UE 102, e.g., via measurements and/or based on information provided by network elements of a wireless network. In some embodiments, the UE 102 includes a barometric sensor and can measure barometric information for the location of the UE 102 and use the barometric measurements alone or in combination with barometric reference data to estimate a vertical location of the UE 102. In some embodiments, the wireless circuitry 316 includes one or more baseband processor(s), and a set of RF analog front-end circuitry. In some embodiments, the wireless circuitry 316 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 316 can include components of RF analog front-end circuitry, e.g. a set of one or more antennas, which can be interconnected with additional supporting RF circuitry that can include filters and other analog components that can be "configured" for transmission and/or reception of analog signals via one or more corresponding antennas to one or more wireless networks.

The processor(s) 312 and the wireless circuitry 316 can be configured to perform and/or control performance of one or more functionalities of the UE 102, in accordance with various implementations. The processor(s) 312 and the wireless circuitry 316 can provide functionality for controlling communication and/or location determination for the UE 102. The processor(s) 312 may include multiple processors of different types that can provide for both wireless communication management and/or higher layer functions, e.g., one or more of the processor(s) 312 may be configured to perform data processing, application execution, and/or other device functions according to one or more embodiments of the disclosure. The UE 102, or portions or components thereof, such as processor(s) 312, can include one or more chipsets, which can respectively include any number of coupled microchips thereon.

In some embodiments, the processor(s) 312 may be configured in a variety of different forms. For example, the processor(s) 312 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 312 of the UE 102 can be coupled to and/or configured in operative communication with each other, and these components may be collectively configured to perform location determination of the UE 102 based at least in part on WLAN/WPAN AP information and/or barometric information, e.g. in conjunction with the location determination module 318. In some implementations, the processor(s) 312 can be configured to execute instructions that may be stored in memory 314, or that can otherwise be accessible to the processor(s) 312 in some other device memory. As such, whether configured as, or in conjunction with, hardware or a combination of hardware and software, the processor(s) 312 may be capable of performing operations according to various implementations described herein, when configured accordingly. In various embodiments, memory 314 in the UE 102 may include multiple memory devices that can be associated with any common volatile or non-volatile memory type. In some scenarios, the memory 314 may be associated with a non-transitory computer-readable storage medium that can store various computer program instructions, which may be executed by the processor(s) 312 during normal program executions. In this regard, the memory 314 can be configured to store information, data, applications, instructions, or the like, for enabling the UE 102 to carry out various functions in accordance with one or more embodiments of the disclosure. In some implementations, the memory 314 may be in communication with, and/or otherwise coupled to, the processor(s) 312, as well as one or more system buses for passing information between and amongst the different device components of the UE 102.

It should be appreciated that not all of the components, device elements, and hardware illustrated in and described with respect to the UE 102 shown in FIG. 3 may be essential to this disclosure, and thus, some of these items may be omitted, consolidated, or otherwise modified within reason. Additionally, in some implementations, the subject matter associated with the UE 102 can be configured to include additional or substitute components, device elements, or hardware, beyond those depicted within the illustration of FIG. 3.

Figure 4:
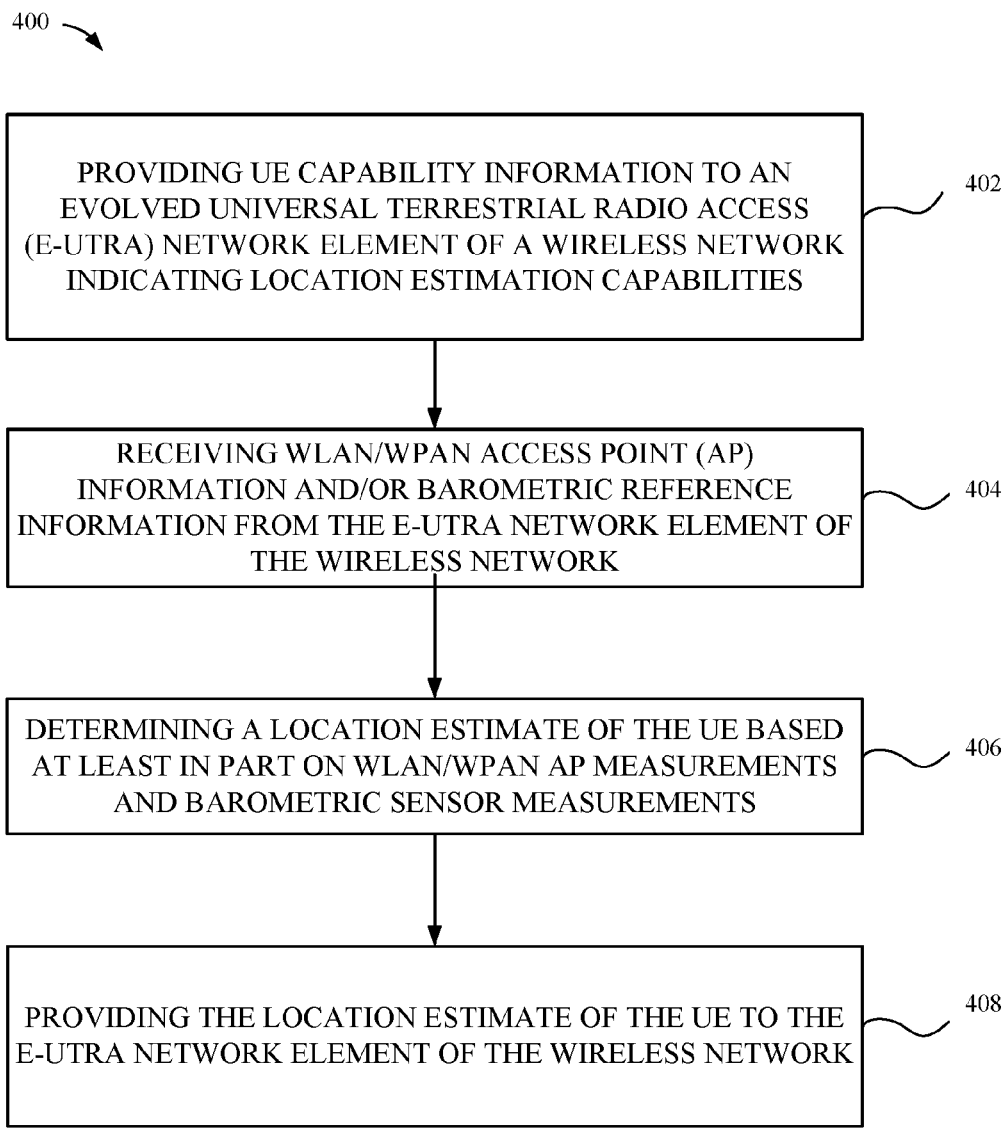
FIG. 4 illustrates a flowchart depicting an example method by a wireless communication device for estimating a location of the wireless communication device based at least in part on a combination of one or more of: wireless local area network (WLAN) access point (AP) measurements, wireless personal area network (WPAN) measurements, or barometric sensor measurements, in accordance with some embodiments.

FIG. 4 illustrates a flowchart 400 of a representative method by a wireless communication device, e.g., UE 102, to estimate a location of the UE 102 based at least in part on WLAN/WPAN AP measurements and/or barometric sensor measurements. In step 402, the UE 102 provides UE capability information for the UE 102 to a network element of a wireless network, e.g., the E-SMLC 114. In some embodiments, the network element is an E-UTRAN of a cellular wireless network operating in accordance with an LTE/LTE-A wireless communications protocol. In some embodiments, the UE 102 provides the UE capability information to the network element of the wireless network in response to receipt of a capabilities inquiry message from the network element of the wireless network. In some embodiments, the capabilities information provided to the network element of the wireless access network includes an indication of location estimation capabilities of the UE 102, e.g., whether the UE 102 can estimate its location based at least in part on WLAN/WPAN AP information (and optionally additionally based on barometric sensor measurements) and/or can provide a location estimate, WLAN/WPAN AP measurements, and/or barometric sensor measurements to the network element of the wireless access network. In some embodiments, the capabilities inquiry received from the network element of the wireless access network includes a "general" inquiry about location estimation capabilities of the UE 102, while in some embodiments, the capabilities inquiry includes a "specific" inquiry about location estimation capabilities regarding the use of WLAN/WPAN AP information, the use of barometric information, and/or the use of (assisted or non-assisted) GPS/GNSS information by the UE 102 to estimate its location. In step 404, which is optional in some embodiments, the UE 102 receives from the network element of the wireless access network, e.g., from the E-SMLC 114, WLAN/WPAN AP information. In some embodiments, barometric reference information is provided by to the UE 102 by one or more network elements of the wireless access network to use in conjunction with barometric sensor information measured by the UE 102. In some embodiments, the WLAN/WPAN AP information is communicated to the UE 102 via one or more of: a measurements control message, an assistance data message, and a system information block (SIB) message. In some embodiments, the WLAN/WPAN AP information include one or more of: a service set identifier (SSID), a frequency band, a frequency channel, a transmit power level, and an antenna gain. In step 406, the UE 102 determines a location estimate for itself based at least in part on WLAN/WPAN AP measurements and/or barometric sensor measurements. In some embodiments, the WLAN/WPAN AP measurements used to determine the location estimate of the UE 102 includes measurements of one or more WLAN/WPAN APs performed by the UE 102 based on the WLAN/WPAN AP information received by the UE 102 from the network element of the wireless access network. In some embodiments, the UE 102 determines the location estimate of the UE 102 without using information provided by the wireless network. In some embodiments, the UE 102 obtains barometric sensor measurements for the UE 102 at its current location (and/or from stored measured barometric sensor information stored in the UE 102) and uses the measured barometric sensor information alone or in combination with barometric reference data provided by the wireless network to estimate a vertical location of the UE 102. In some embodiments, step 404 is not used, and the UE 102 determines the location estimate of the UE 102 based on information gathered, obtained, and/or measured by the UE 102 without using assistance data from the wireless network. In step 408, the UE 102 provides the location estimate of the UE 102 to the network element of the wireless access network. In some embodiments, the location estimate of the UE 102 is provided to the network element of the wireless network in "provide location information" message. In some embodiment, the UE 102 provides at least a portion of the WLAN/WPAN AP measurements to the network element of the wireless access network in addition to or in place of the location estimate of the UE 102. In some embodiments, the UE 102 also provides barometric sensor information to the network element to use in estimating a vertical location of the UE 102. When the UE 102 provides WLAN/WPAN AP measurements (possibly also including GPS/GNSS information and/or barometric information) to the network element of the wireless network, in some embodiments, the network element, alone or in conjunction with one or more other network elements of a wireless network, estimates a location for the UE 102 based at least in part on the provided WLAN/WPAN AP measurements (possibly also based on GPS/GNSS information and/or barometric information provided by the UE 102).

Figure 5:
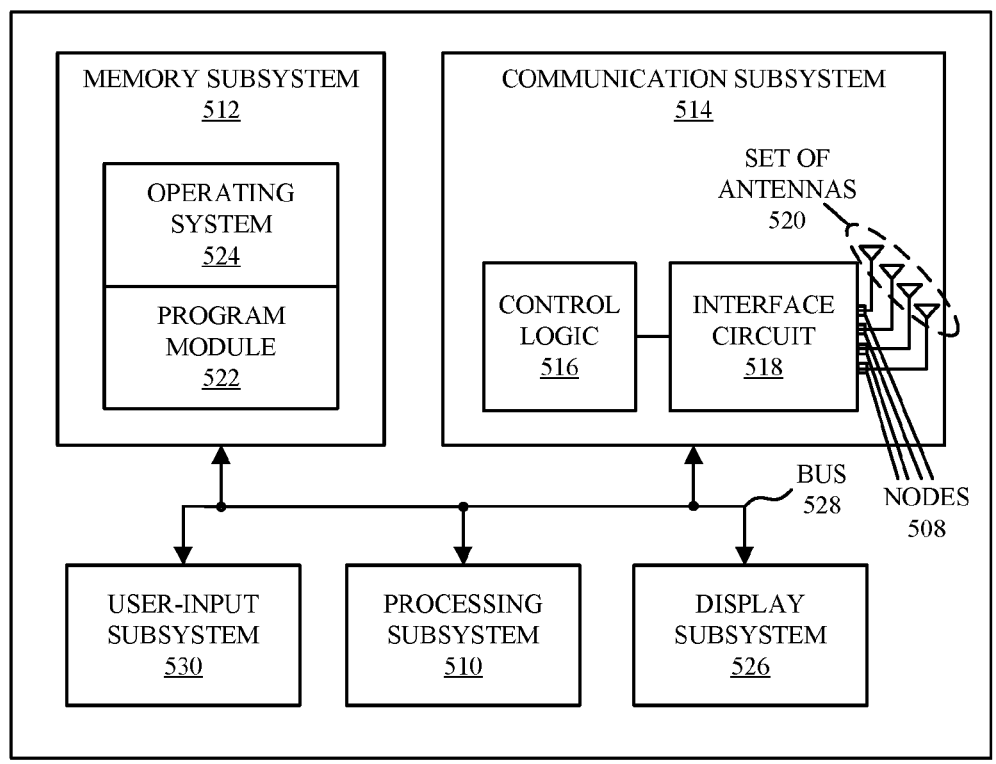
FIG. 5 illustrates a detailed view of an exemplary computing device that can be used to implement at least a portion of the various techniques described herein, in accordance with some embodiments.

FIG. 5 presents a block diagram of a representative electronic device 500, which can be UE 102, in accordance with some embodiments. This electronic device 500 includes processing subsystem 510, memory subsystem 512, and communication subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs). In some embodiments, processing subsystem 510 can represent all or portions of processors 312, location determination module 318, and/or processing circuitry 310 of FIG. 3.

Memory subsystem 512 includes one or more devices for storing data and/or instructions for processing subsystem 510 and communication subsystem 514. For example, memory subsystem 512 can include dynamic random access memory (DRAM), static random access memory (SRAM), a read-only memory (ROM), flash memory, and/or other types of memory. In some embodiments, instructions for processing subsystem 510 in memory subsystem 512 include: one or more program modules or sets of instructions (such as program module 522 or operating system 524), which may be executed by processing subsystem 510. For example, a ROM can store programs, utilities or processes to be executed in a non-volatile manner, and DRAM can provide volatile data storage, and may store instructions related to the operation of the electronic device. Note that the one or more computer programs may constitute a computer-program mechanism or software. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510. In some embodiments, the one or more computer programs are distributed over a network-coupled computer system so that the one or more computer programs are stored and executed in a distributed manner. In some embodiments, memory subsystem 512 can represent all or portions of processing circuitry 310, location determination module 318, and/or memory 314 of FIG. 3.

In addition, memory subsystem 512 can include mechanisms for controlling access to the memory. In some embodiments, memory subsystem 512 includes a memory hierarchy that comprises one or more caches coupled to a memory in the electronic device. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by the electronic device as fast-access storage for often-used data, while the mass-storage device is used to store less frequently used data.

Communication subsystem 514 includes one or more devices configured to couple to and communicate on a wired and/or wireless network (e.g., to perform network operations), including: control logic 516, an interface circuit 518 and a set of antennas 520 (or antenna elements) in an adaptive array that can be selectively turned on and/or off by control logic 516 to create a variety of optional antenna patterns or 'beam patterns.' (While FIG. 5 includes set of antennas 520, in some embodiments the electronic device 500 includes one or more nodes, such as nodes 508, e.g., a pad, which can be coupled to set of antennas 520. Thus, the electronic device 500 may or may not include set of antennas 520.) For example, communication subsystem 514 can include a Bluetooth™ communication system, a cellular communication system (e.g., for communication with a 3G/4G network such as UMTS, LTE, etc.), a universal serial bus (USB) communication system, a communication system based on the standards described in IEEE 802.11 (e.g., a Wi-Fi® communication system), an Ethernet communication system, and/or another communication system.

Communication subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on a network for each communication system are sometimes collectively referred to as a 'network interface' for the communication system. Moreover, in some embodiments a 'network' or a 'connection' between the electronic devices does not yet exist. Therefore, the electronic device 500 may use the mechanisms in communication subsystem 514 for performing simple wireless communication between the electronic devices, e.g., transmitting advertising or beacon frames and/or scanning for advertising frames transmitted by other electronic devices. In some embodiments, communication subsystem 514 can represent all or portions of wireless circuitry 316 of FIG. 3.

Within the electronic device 500, processing subsystem 510, memory subsystem 512, and communication subsystem 514 are coupled together using bus 528 that facilitates data transfer between these components. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the sub systems.

In some embodiments, the electronic device 500 includes a display subsystem 526 for displaying information on a display, which may include a display driver and the display, such as a liquid-crystal display, a multi-touch touchscreen, etc. Display subsystem 526 may be controlled by processing subsystem 510 to display information to a user (e.g., information relating to incoming, outgoing, or an active communication session).

The electronic device 500 can also include a user-input subsystem 530 that allows a user of the electronic device 500 to interact with the electronic device 500. For example, user-input subsystem 530 can take a variety of forms, such as: a button, keypad, dial, touch screen, audio input interface, visual/image capture input interface, input in the form of sensor data, etc.

The electronic device 500 can be (or can be included in) any electronic device 500 with at least one communication/network interface. For example, the electronic device 500 may include: a cellular telephone or a smartphone, a tablet computer, a laptop computer, a notebook computer, a personal or desktop computer, a netbook computer, a media player device, an electronic book device, a MiFi® device, a smart watch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 500, in alternative embodiments, different components and/or subsystems may be present in the electronic device 500. For example, the electronic device 500 may include one or more additional processing subsystems, memory subsystems, networking subsystems, and/or display subsystems. Additionally, one or more of the subsystems may not be present in the electronic device 500. Moreover, in some embodiments, the electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in the electronic device 500. For example, in some embodiments program module 522 is included in operating system 524 and/or control logic 516 is included in interface circuit 518.

Moreover, the circuits and components in the electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of communication subsystem 514. This integrated circuit may include hardware and/or software mechanisms that are used for transmitting wireless signals from the electronic device 500 and receiving signals at the electronic device 500 from other electronic devices. Aside from the mechanisms herein described, radios are generally known in the art and hence are not described in detail. In general, communication subsystem 514 and/or the integrated circuit can include any number of radios. Note that the radios in multiple-radio embodiments function in a similar way to the described single-radio embodiments.

In some embodiments, communication subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises a trigger, providing a trigger response, etc.).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a wireless communication protocol as an illustrative example, in other embodiments a wide variety of communication protocols and, more generally, wireless and/or wired communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) or in firmware in interface circuit 518. Alternatively or additionally, at least some of the operations in the communication technique may be implemented in a physical layer, in a MAC layer, and/or in higher layers, such as implemented in a combination of hardware, software, and/or firmware in interface circuit 518.

In the preceding description, we refer to 'some embodiments.' Note that 'some embodiments' describes a subset of all of the possible embodiments, but does not always specify the same subset of embodiments.

The various aspects, embodiments, implementations or features of the described embodiments can be used separately or in any combination. Further, some aspects of the described embodiments may be implemented by software, by hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

REFERENCES

The following wireless standards documents are incorporated by reference herein in their entirety for all purposes: 3GPP TS 25.032: "Universal Geographical Area Description (GAD)" [Reference 15]; IEEE 802.11, Part 11: "Wireless LAN Medium Access Control (MAC) and Physical Layer (PHY) specifications" [Reference 24]; and Bluetooth Special Interest Group: "Bluetooth Core Specification v4.2", December 2014 [Reference 25].

ABBREVIATIONS

Some or all of the following abbreviations may be used in this Application.
ADR Accumulated Delta-Range
A-GNSS Assisted-GNSS
AP Access Point
ARFCN Absolute Radio Frequency Channel Number
BDS BeiDou Navigation Satellite System
BT Bluetooth
BTS Base Transceiver Station (GERAN)
CID Cell-ID (positioning method)
CNAV Civil Navigation
CRS Cell-specific Reference Signals
ECEF Earth-Centered, Earth-Fixed
ECGI Evolved Cell Global Identifier
ECI Earth-Centered-Inertial
E-CID Enhanced Cell-ID (positioning method)
EGNOS European Geostationary Navigation Overlay Service
E-SMLC Enhanced Serving Mobile Location Centre
E-UTRAN Evolved Universal Terrestrial Radio Access Network
EOP Earth Orientation Parameters
EPDU External Protocol Data Unit
FDMA Frequency Division Multiple Access
FEC Forward Error Correction
FTA Fine Time Assistance
GAGAN GPS Aided Geo Augmented Navigation
GLONASS GLObal'naya NAvigatsionnaya Sputnikovaya Sistema (Engl.: Global Navigation Satellite System)
GNSS Global Navigation Satellite System
GPS Global Positioning System
ICD Interface Control Document
IOD Issue of Data
IS Interface Specification
LPP LTE Positioning Protocol
LPPa LTE Positioning Protocol Annex
LSB Least Significant Bit
MO-LR Mobile Originated Location Request
MSAS Multi-functional Satellite Augmentation System
MSB Most Significant Bit
msd mean solar day
MT-LR Mobile Terminated Location Request
NAV Navigation
NICT National Institute of Information and Communications Technology
NI-LR Network Induced Location Request
NTSC National Time Service Center of Chinese Academy of Sciences
OTDOA Observed Time Difference Of Arrival
PRC Pseudo-Range Correction
PRS Positioning Reference Signals
PDU Protocol Data Unit
PZ-90 Parametry Zemli 1990 Goda—Parameters of the Earth Year 1990
QZS Quasi Zenith Satellite
QZSS Quasi-Zenith Satellite System
QZST Quasi-Zenith System Time
RF Radio Frequency
RRC Range-Rate Correction
  Radio Resource Control
RSRP Reference Signal Received Power
RSRQ Reference Signal Received Quality
RSTD Reference Signal Time Difference
RU Russia
SBAS Space Based Augmentation System
SET SUPL Enabled Terminal
SFN System Frame Number
SLP SUPL Location Platform
SUPL Secure User Plane Location
SV Space Vehicle
TLM Telemetry
TOD Time Of Day
TOW Time Of Week
UDRE User Differential Range Error
ULP User Plane Location Protocol
USNO US Naval Observatory
UT1 Universal Time No. 1
UTC Coordinated Universal Time
WAAS Wide Area Augmentation System
WGS-84 World Geodetic System 1984
WLAN Wireless Local Area Network
3GPP TS 25.331 Proposed Changes
  3GPP TS 36.355 Section 6.3 entitled "Message Body Information Elements (IEs)" can be modified to include WLAN, WPAN (e.g., BT), and/or Sensor location information as follows.
RequestCapabilities
The RequestCapabilities message body in a LPP message is used by the location server to request the target device capability information for LPP and the supported individual positioning methods.

```
-- ASN1START
RequestCapabilities ::= SEQUENCE {
    criticalExtensions   CHOICE {
        c1                       CHOICE {
            requestCapabilities-r9    RequestCapabilities-r9-IEs,
            spare3 NULL, spare2 NULL, spare1 NULL
        },
        criticalExtensionsFuture    SEQUENCE { }
    }
}
RequestCapabilities-r9-IEs ::= SEQUENCE {
    commonIEsRequestCapabilities   CommonIEsRequestCapabilities   OPTIONAL,  -- Need ON
    a-gnss-RequestCapabilities     A-GNSS-RequestCapabilities     OPTIONAL,  -- Need ON
    otdoa-RequestCapabilities      OTDOA-RequestCapabilities      OPTIONAL,  -- Need ON
    ecid-RequestCapabilities       ECID-RequestCapabilities       OPTIONAL,  -- Need ON
    epdu-RequestCapabilities       EPDU-Sequence                  OPTIONAL,  -- Need ON
    ...,
    sensors-RequestCapabilities    Sensors-RequestCapabilites     OPTIONAL,  -- Need ON
    wlan-RequestCapabilities       WLAN-RequestCapabilites        OPTIONAL,  -- Need ON
```

| | | |
|---|---|---|
| bt-RequestCapabilities | BT-RequestCapabilites | OPTIONAL, -- Need ON |

```
}
-- ASN1STOP
```

RequestCapabilities field descriptions commonIEsRequestCapabilities

This IE is provided for future extensibility and should not be included in this version of the protocol.

ProvideCapabilities  
The ProvideCapabilities message body in a LPP message indicates the LPP capabilities of the target device to the location server.

```
-- ASN1START
ProvideCapabilities ::= SEQUENCE {
    criticalExtensions   CHOICE {
        c1                         CHOICE {
            provideCapabilities-r9     ProvideCapabilities-r9-IEs,
            spare3 NULL, spare2 NULL, spare1 NULL
        },
        criticalExtensionsFuture   SEQUENCE { }
    }
}
ProvideCapabilities-r9-IEs ::= SEQUENCE {
    commonIEsProvideCapabilities    CommonIEsProvideCapabilities    OPTIONAL,
    a-gnss-ProvideCapabilities      A-GNSS-ProvideCapabilities      OPTIONAL,
    otdoa-ProvideCapabilities       OTDOA-ProvideCapabilities       OPTIONAL,
    ecid-ProvideCapabilities        ECID-ProvideCapabilities        OPTIONAL,
    epdu-ProvideCapabilities        EPDU-Sequence                   OPTIONAL,
    ...,
    sensors-ProvideCapabilities     Sensors-ProvideCapabilites      OPTIONAL,
    wlan-ProvideCapabilities        WLAN-ProvideCapabilites         OPTIONAL,
    bt-ProvideCapabilities          BT-ProvideCapabilites           OPTIONAL,
}
-- ASN1STOP
```

ProvideCapabilities field descriptions commonIEsProvideCapabilities

This IE is provided for future extensibility and should not be included in this version of the protocol.

RequestAssistanceData  
The RequestAssistanceData message body in a LPP message is used by the target device to request assistance data from the location server.

```
-- ASN1START
RequestAssistanceData ::= SEQUENCE {
    criticalExtensions   CHOICE {
        c1                         CHOICE {
            requestAssistanceData-r9   RequestAssistanceData-r9-IEs,
            spare3 NULL, spare2 NULL, spare1 NULL
        },
        criticalExtensionsFuture   SEQUENCE { }
    }
}
RequestAssistanceData-r9-IEs ::= SEQUENCE {
    commonIEsRequestAssistanceData  CommonIEsRequestAssistanceData  OPTIONAL,
    a-gnss-RequestAssistanceData    A-GNSS-RequestAssistanceData    OPTIONAL,
    otdoa-RequestAssistanceData     OTDOA-RequestAssistanceData     OPTIONAL,
    epdu-RequestAssistanceData      EPDU-Sequence                   OPTIONAL,
    ...
}
-- ASN1STOP
```

ProvideAssistanceData  
The ProvideAssistanceData message body in a LPP message is used by the location server to provide assistance data to the target device either in response to a request from the target device or in an unsolicited manner.

```
-- ASN1START
ProvideAssistanceData ::= SEQUENCE {
    criticalExtensions   CHOICE {
        c1                       CHOICE {
            provideAssistanceData-r9  ProvideAssistanceData-r9-IEs,
            spare3 NULL, spare2 NULL, spare1 NULL
        },
        criticalExtensionsFuture       SEQUENCE { }
    }
}
ProvideAssistanceData-r9-IEs ::= SEQUENCE {
    commonIEsProvideAssistanceData   CommonIEsProvideAssistanceData   OPTIONAL,   -- Need ON
    a-gnss-ProvideAssistanceData     A-GNSS-ProvideAssistanceData     OPTIONAL,   -- Need ON
    otdoa-ProvideAssistanceData      OTDOA-ProvideAssistanceData      OPTIONAL,   -- Need ON
    epdu-Provide-Assistance-Data     EPDU-Sequence                    OPTIONAL,   -- Need ON
    ...
}
-- ASN1STOP
```

| ProvideAssistanceData field descriptions |
|---|
| commonIEsProvideAssistanceData |
| This IE is provided for future extensibility and should not be included in this version of the protocol. |

RequestLocationInformation
The RequestLocationInformation message body in a LPP message is used by the location server to request positioning measurements or a position estimate from the target device.

```
-- ASN1START
RequestLocationInformation ::= SEQUENCE {
    criticalExtensions   CHOICE {
        c1                   CHOICE {
            requestLocationInformation-r9  RequestLocationInformation-r9-IEs,
            spare3 NULL, spare2 NULL, spare1 NULL
        },
        criticalExtensionsFuture       SEQUENCE { }
    }
}
RequestLocationInformation-r9-IEs ::= SEQUENCE {
    commonIEsRequestLocationInformation
                                     CommonIEsRequestLocationInformation   OPTIONAL,   -- Need ON
    a-gnss-RequestLocationInformation    A-GNSS-RequestLocationInformation    OPTIONAL,   -- Need ON
    otdoa-RequestLocationInformation     OTDOA-RequestLocationInformation     OPTIONAL,   -- Need ON
    ecid-RequestLocationInformation      ECID-RequestLocationInformation      OPTIONAL,   -- Need ON
    epdu-RequestLocationInformation      EPDU-Sequence                        OPTIONAL,   -- Need ON
    ...,
    sensors-RequestLocationInformation   Sensors-RequestLocationInformation   OPTIONAL,   -- Need ON
    wlan-RequestLocationInformation      WLAN-RequestLocationInformation      OPTIONAL,   -- Need ON
    bt-RequestLocationInformation        BT-RequestLocationInformation        OPTIONAL,   -- Need ON
}
-- ASN1STOP
```

| RequestLocationInformation field descriptions |
|---|
| commonIEsRequestLocationInformation |
| This field specifies the location information type requested by the location server and optionally other configuration information associated with the requested location information. This field should always be included in this version of the protocol. |

ProvideLocationInformation
The ProvideLocationInformation message body in a LPP message is used by the target device to provide positioning measurements or position estimates to the location server.

```
-- ASN1START
ProvideLocationInformation ::= SEQUENCE {
    criticalExtensions   CHOICE {
        c1                   CHOICE {
            provideLocationInformation-r9   ProvideLocationInformation-r9-IEs,
            spare3 NULL, spare2 NULL, spare1 NULL
```

```
        },
        criticalExtensionsFuture        SEQUENCE { }
    }
}
ProvideLocationInformation-r9-IEs ::= SEQUENCE {
    commonIEsProvideLocationInformation
                                        CommonIEsProvideLocationInformation     OPTIONAL,
    a-gnss-ProvideLocationInformation   A-GNSS-ProvideLocationInformation       OPTIONAL,
    otdoa-ProvideLocationInformation    OTDOA-ProvideLocationInformation        OPTIONAL,
    ecid-ProvideLocationInformation     ECID-ProvideLocationInformation         OPTIONAL,
    epdu-ProvideLocationInformation     EPDU-Sequence                           OPTIONAL,
    ...,
    sensors-ProvideLocationInformation  Sensors-ProvideLocationInformation      OPTIONAL,
    wlan-ProvideLocationInformation     WLAN-ProvideLocationInformation         OPTIONAL,
    bt-ProvideLocationInformation       BT-ProvideLocationInformation           OPTIONAL,
}
-- ASN1STOP
```

3GPP TS 36.355 Section 6.4.2 entitled "Common Positioning" can be modified to include WLAN, WPAN (e.g., BT), and/or Sensor location information as follows.
CommonIEsProvideLocationInformation
The CommonIEsProvideLocationInformation carries common IEs for a Provide Location Information LPP message Type.

```
-- ASN1START
CommonIEsProvideLocationInformation ::= SEQUENCE {
        locationEstimate                LocationCoordinates             OPTIONAL,
        velocityEstimate                Velocity                        OPTIONAL,
        locationError                   LocationError                   OPTIONAL,
        ...,
        [[      earlyFixReport-r12      EarlyFixReport-r12              OPTIONAL
        ]],
        [[      locationInfo            locationInfo                    OPTIONAL
        ]],
}
LocationCoordinates ::= CHOICE {
        ellipsoidPoint                                  Ellipsold-Point,
        ellipsoidPointWithUncertaintyCircle             Ellipsoid-PointWithUncertaintyCircle,
        ellipsoidPointWithUncertaintyEllipse            EllipsoidPointWithUncertaintyEllipse,
        polygon                                         Polygon,
        ellipsoidPointWithAltitude                      EllipsoidPointWithAltitude,
        ellipsoidPointWithAltitudeAndUncertaintyEllipsoid
                                                        EllipsoidPointWithAltitudeAndUncertaintyEllipsoid,
        ellipsoidArc                                    EllipsoidArc,
        ...
}
Velocity ::= CHOICE {
        horizontalVelocity                              HorizontalVelocity,
        horizontalWithVerticalVelocity                  HorizontalWithVerticalVelocity,
        horizontalVelocityWithUncertainty               HorizontalVelocityWithUncertainty,
        horizontalWithVerticalVelocityAndUncertainty
                                                        HorizontalWithVerticalVelocityAndUncertainty,
        ...
}
LocationError ::= SEQUENCE {
        locationfailurecause            LocationFailureCause,
        ...
}
LocationFailureCause ::= ENUMERATED {
    undefined,
    requestedMethodNotSupported,
    positionMethodFailure,
    periodicLocationMeasurementsNotAvailable,
    ...
}
EarlyFixReport-r12 ::= ENUMERATED {
    noMoreMessages,
    moreMessagesOnTheWay
}
LocationInfo ::= SEQUENCE {
                locationSource          LocationSource          OPTIONAL,
                locationTimeStamp       LocationTimeStamp       OPTIONAL,
                ...
```

```
}
LocationSource ::= BIT STRING {       gnss       (0),
                                      otdoa      (1),
                                      ecid       (2),
                                      WLAN       (3),
                                      BT         (4),
                                      Sensors    (5) } (SIZE(1..16))
LocationReferenceTime VisibleString (SIZE (14))
-- ASN1STOP
```

| CommonIEsProvideLocationInformation field descriptions |
|---|
| locationEstimate |
| This field provides a location estimate using one of the geographic shapes defined in 3GPP TS 23.032 [Reference 15]. Coding of the values of the various fields internal to each geographic shape follow the rules in [Reference 15]. The conditions for including this field are defined for the locationInformationType field in a Request Location Information message. |
| velocityEstimate |
| This field provides a velocity estimate using one of the velocity shapes defined in 3GPP TS 23.032 [Reference 15]. Coding of the values of the various fields internal to each velocity shape follow the rules in [Reference 15]. |
| locationError |
| This field shall be included if and only if a location estimate and measurements are not included in the LPP PDU. The field includes information concerning the reason for the lack of location information. The LocationFailureCause 'periodicLocationMeasurementsNotAvailable' shall be used by the target device if periodic location reporting was requested, but no measurements or location estimate are available when the reportingInterval expired. |
| earlyFixReport |
| This field shall be included if and only if the ProvideLocationInformation message contains early location measurements or an early location estimate. The target device shall set the values of this field as follows:<br>   noMoreMessages: This is the only or last ProvideLocationInformation message used to deliver the entire set of early location information.<br>   moreMessagesOnTheWay: This is one of multiple ProvideLocationInformation messages used to deliver the entire set of early location information (if early location information will not fit into a single message). |
| LocationSource |
| The field includes information concerning the sources of the locationEstimate. |
| LocationReferenceTime |
| This field provides the UTC time when the location estimate is performed. The universalTime is expressed as yyyyMMddhhmmss, where:<br>yyyy  Year<br>MM    Month<br>dd     Day<br>hh     Hours<br>mm    Minutes<br>ss     Seconds. |

3GPP TS 36.355 Section 6.5.4 entitled "WLAN-based Positioning" can be modified to include WLAN, WPAN (e.g., BT), and/or Sensor location information as follows.

3GPP TS 36.355 Section 6.5.4.1 entitled "WLAN Location Information" can be modified to include WLAN, WPAN (e.g., BT), and/or Sensor location information as follows.

WLAN-ProvideLocationInformation

The IE WLAN-ProvideLocationInformation is used by the target device, operating in UE-assisted mode, to provide WLAN measurements to the location server.

```
-- ASN1START
WLAN-ProvideLocationInformation ::= SEQUENCE {
    wlan-MeasurementInformation    WLAN-MeasurementInformation    OPTIONAL,
    wlan-Error                     WLAN-Error                     OPTIONAL,
    ...
}
-- ASN1STOP
```

3GPP TS 36.355 Section 6.5.4.2 entitled "WLAN Location Information Elements" can be modified to include WLAN, WPAN (e.g., BT), and/or Sensor location information as follows.

WLAN-MeasurementInformation

The IE WLAN-MeasurementInformation is used by the target device to provide WLAN measurements to the location server.

3GPP TS 36.355 Section 6.5.4.3 entitled "WLAN Location Information Request" can be modified to include WLAN, WPAN (e.g., BT), and/or Sensor location information as follows.

WLAN-RequestLocationInformation

The IE WLAN-RequestLocationInformation is used by the location server to request WLAN location measurements from a target device.

```
-- ASN1START
WLAN-MeasurementInformation ::= SEQUENCE {
    wlan-MeasuredResultsList        WLAN-MeasuredResultsList,
    locationReferencetime           LocationReferencetime           OPTIONAL,
    ...
}
MeasuredResultsList::= SEQUENCE (SIZE(1..32)) OF WLAN-MeasuredResultsElement
WLAN-MeasuredResultsElement ::= SEQUENCE {
    wlan-AP-Identifier              WLAN-AP-Identifier,
    wlan-RSSI                       INTEGER (-127..128)             OPTIONAL,
    wlan-RTT                        WLAN-RTT-Info                   OPTIONAL,
    ...
}
WLAN-AP-Identifier          ::=     SEQUENCE {
    Bssid                           BIT STRING (SIZE (48)),
    Ssid                                OCTET STRING (SIZE (1..32))  OPTIONAL,
    ...
}
WLAN-RTT-Info ::= SEQUENCE {
    rttValue            INTEGER (0..16777215),
    rttUnits            ENUMERATED {    microseconds,
                                        hundredsofnanoseconds,
                                        tensofnanoseconds,
                                        nanoseconds,
                                        tenthsofnanoseconds,
                                        ... },
    rttAccuracy         INTEGER (0..255)                            OPTIONAL,
    ...}
-- ASN1STOP
```

| WLAN-MeasurementInformation field descriptions |
| --- |
| locationReferencetime |
| This field specifies the time when the WLAN measurements have been made. The target device shall include this field if it was able to determine the time of measurement. |
| wlan-MeasuredResultsList |
| This field includes the WLAN measurements for up to 32 APs. |
| wlan-AP-Identifier |
| This field specifies the identity of the measured WLAN AP. |
| wlan-RTT |
| This field specifies the Round Trip Time (RTT) measurement between the target device and WLAN AP. |
| bssid |
| This field provides the Basic Service Set Identifier (BSSID) [Reference 24] of the measured WLAN AP (which is identical to the MAC address of the AP). |
| ssid |
| This field provides the Service Set Identifier (SSID) [Reference 24] of the wireless network served by the AP. |
| rttValue |
| This field specifies the Round Trip Time (RTT) measurement between the target device and WLAN AP in units given by the field rttUnits. |
| rttUnits |
| This field specifies the Units for the fields rttValue and rttAccuracy. The available Units are 1000 ns, 100 ns, 10 ns, 1 ns or 0.1 ns. |
| rttAccuracy |
| This field provides the estimated accuracy of the provided rttValue expressed as the standard deviation in units given by the field rttUnits. |

```
-- ASN1START
WLAN-RequestLocationInformation ::= SEQUENCE {
    requestedMeasurements    BIT STRING {    rssiReq    (0),
                                             ttiReq     (1) } (SIZE(1..8)),    OPTIONAL,
    ...
}
-- ASN1STOP
```

| WLAN-RequestLocationInformation field descriptions |
|---|
| requestedMeasurements |
| This field specifies the WLAN measurements requested in ue-assisted mode. This is represented by a bit string, with a one-value at the bit position means the particular measurement is requested; a zero-value means not requested. |

3GPP TS 36.355 Section 6.5.4.4 entitled "WLAN Capability Information" can be modified to include WLAN, WPAN (e.g., BT), and/or Sensor location information as follows.
WLAN-ProvideCapabilities
The IE WLAN-ProvideCapabilities is used by the target device to indicate its capability to support WLAN and to provide its WLAN location capabilities to the location server.

```
-- ASN1START
WLAN-ProvideCapabilities ::= SEQUENCE {
    wlan-Modes              PositioningModes,
    wlan-MeasSupported BIT STRING {  rssiSup    (0),
                                     rttSup     (1) } (SIZE(1..8)), OPTIONAL,   -- Cond modes
    ...
}
-- ASN1STOP
```

| WLAN-Provide-Capabilities field descriptions |
|---|
| wlan-Modes |
| This field specifies the WLAN mode(s) supported by the target device. This is represented by a bit string, with a one-value at the bit position means the particular WLAN mode is supported; a zero-value means not supported. |
| wlan-MeasSupported |
| This field specifies that the target device is capable of performing rssi and/or round trip time measurements. A bit string represents this, with a one-value at the bit position means the particular measurement is supported; a zero-value means not supported. This field is mandatory present if the target device supports ue-assisted mode; otherwise it is not present. |

3GPP TS 36.355 Section 6.5.4.5 entitled "WLAN Capability Information Request" can be modified to include WLAN, WPAN (e.g., BT), and/or Sensor location information as follows.
WLAN-RequestCapabilities
The IE WLAN-RequestCapabilities is used by the location server to request WLAN positioning capabilities from a target device.

```
-- ASN1START
WLAN-RequestCapabilities ::= SEQUENCE {
    ...
}
-- ASN1STOP
```

3GPP TS 36.355 Section 6.5.4.6 entitled "WLAN Error Elements" can be modified to include WLAN, WPAN (e.g., BT), and/or Sensor location information as follows.
WLAN-Error
The IE WLAN-Error is used by the location server or target device to provide WLAN error reasons.

```
-- ASN1START
WLAN-Error ::= CHOICE {
    targetDeviceErrorCauses    WLAN-TargetDeviceErrorCauses,
    ...
}
-- ASN1STOP
```

WLAN-TargetDeviceErrorCauses
The IE WLAN-TargetDeviceErrorCauses is used by the target device to provide WLAN error reasons to the location server.

```
-- ASN1START
WLAN-TargetDeviceErrorCauses ::= SEQUENCE {
    cause    ENUMERATED {                    undefined,
```

```
                                                        requestedMeasurementNotAvailable,
                                                        notAllrequestedMeasurementsPossible,
                                                        ...
                },
        wlan-AP-ID-MeasurementNotPossible               NULL    OPTIONAL,
        wlan-AP-RSSI-MeasurementNotPossible             NULL    OPTIONAL,
        wlan-AP-RTT-MeasurementNotPossible              NULL    OPTIONAL   ...
}
-- ASN1STOP
```

| WLAN-TargetDeviceErrorCauses field descriptions |
|---|
| cause |
| This field provides a WLAN specific error cause. If the cause value is 'notAllRequestedMeasurementsPossible', the target device was not able to, calculate the position using WLAN or provide all requested WLAN measurements (bu tmay be able to provide some measurements). In this case, the target device should include any of the 'wlan-AP-ID-MeasurementNotPossible', 'wlan-AP-RSSI-MeasurementNotPossible', 'wlan-AP-RTT-MeasurementNotPossible' fields, as applicable. |

3GPP TS 36.355 Section 6.5.5 entitled "Bluetooth-based Positioning" can be modified to include WLAN, WPAN (e.g., BT), and/or Sensor location information as follows.

3GPP TS 36.355 Section 6.5.5.1 entitled "Bluetooth Location Information" can be modified to include WLAN, WPAN (e.g., BT), and/or Sensor location information as follows.

BT-ProvideLocationInformation

The IE BT-ProvideLocationInformation is used by the target device, operating in UE-assisted mode, to provide Bluetooth measurements to the location server.

```
-- ASN1START
BT-ProvideLocationInformation ::= SEQUENCE {
    bt-MeasurementInformation       BT-MeasurementInformation       OPTIONAL,
    bt-Error                        BT-Error                        OPTIONAL,
    ...
}
-- ASN1STOP
```

3GPP TS 36.355 Section 6.5.5.2 entitled "Bluetooth Location Information Elements" can be modified to include WLAN, WPAN (e.g., BT), and/or Sensor location information as follows.

BT-MeasurementInformation

The IE BT-MeasurementInformation is used by the target device to provide Bluetooth measurements to the location server.

```
-- ASN1START
BT-MeasurementInformation   ::= SEQUENCE {
    bt-MeasuredResultsList              BT-MeasuredResultsList,
    locationReferencetime               LocationReferencetime       OPTIONAL,
    ...
}
MeasuredResultsList::= SEQUENCE (SIZE(1..32)) OF BT-MeasuredResultsElement
BT-MeasuredResultsElement ::= SEQUENCE {
    bt-beacon-Identifier        BT-Beacon-Identifier,
    bt-RSSI                     INTEGER (-127..128)                 OPTIONAL,
    bt-RTT                      BT-RTT-Info                         OPTIONAL,
    ...
}
BT-Beacon-Identifier ::=                SEQUENCE {
    macAddress                          BIT STRING (SIZE (48)),
    ...
}
BT-RTT-Info ::= SEQUENCE {
    rttValue        INTEGER (0..16777215),
    rttUnits        ENUMERATED {    microseconds,
                                    hundredsofnanoseconds,
                                    tensofnanoseconds,
                                    nanoseconds,
                                    tenthsofnanoseconds,
                                    ... },
    rttAccuracy     INTEGER (0..255)                                OPTIONAL,
```

-continued

```
    ...}
-- ASN1STOP
```

| BT-MeasurementInformation field descriptions |
|---|
| bt-MeasuredResultsList |
| This field includes the BT measurements for up to 32 BT beacons. |
| macAddress |
| This field specifies the MAC address of the BT beacon [Reference 25]. |

3GPP TS 36.355 Section 6.5.5.3 entitled "Bluetooth Location Information Request" can be modified to include WLAN, WPAN (e.g., BT), and/or Sensor location information as follows.

BT-RequestLocationInformation

The IE BT-RequestLocationInformation is used by the location server to request BT location measurements from a target device.

```
-- ASN1START
BT-RequestLocationInformation ::= SEQUENCE {
    requestedMeasurements    BIT STRING {    rssiReq    (0),
                                             ttiReq     (1) } (SIZE(1..8)),    OPTIONAL,
    ...
}
-- ASN1STOP
```

| BT-RequestLocationInformation field descriptions |
|---|
| requestedMeasurements |
| This field specifies the BT measurements requested in ue-assisted mode. This is represented by a bit string, with a one-value at the bit position means the particular measurement is requested; a zero-value means not requested. |

3GPP TS 36.355 Section 6.5.5.4 entitled "Bluetooth Capability Information" can be modified to include WLAN, WPAN (e.g., BT), and/or Sensor location information as follows.

BT-ProvideCapabilities

The IE BT-ProvideCapabilities is used by the target device to indicate its capability to support BT and to provide its Bluetooth location capabilities to the location server.

3GPP TS 36.355 Section 6.5.5.5 entitled "Bluetooth Capability Information Request" can be modified to include WLAN, WPAN (e.g., BT), and/or Sensor location information as follows.

BT-RequestCapabilities

The IE BT-RequestCapabilities is used by the location server to request Bluetooth positioning capabilities from a target device.

```
-- ASN1START
BT-ProvideCapabilities ::= SEQUENCE {
    bt-Modes                PositioningModes,
    bt-MeasSupported   BIT STRING {    rssiSup    (0),
                                       rttSup     (1) } (SIZE(1..8)), OPTIONAL,    -- Cond modes
    ...
}
-- ASN1STOP
```

| BT-Provide-Capabilities field descriptions |
|---|
| bt-Modes |
| This field specifies the Bluetooth mode(s) supported by the target device. This is represented by a bit string, with a one-value at the bit position means the particular Bluetooth mode is supported; a zero-value means not supported. |
| bt-MeasSupported |
| This field specifies that the target device is capable of performing rssi and/or round trip time measurements. A bit string represents this, with one-value at the bit position means the particular measurement is supported; a zero-value means not supported. This field is mandatory present if the target device supports ue-assisted mode; otherwise it is not present. |

```
-- ASN1START
BT-RequestCapabilities ::= SEQUENCE {
    ...
}
-- ASN1STOP
```

3GPP TS 36.355 Section 6.5.5.6 entitled "Bluetooth Error Elements" can be modified to include WLAN, WPAN (e.g., BT), and/or Sensor location information as follows.
BT-Error
The IE BT-Error is used by the location server or target device to provide BT error reasons.

```
-- ASN1START
BT-Error ::= CHOICE {
            targetDeviceErrorCauses     BT-TargetDeviceErrorCauses,
    ...
}
-- ASN1STOP
```

BT-TargetDeviceErrorCauses
The IE BT-TargetDeviceErrorCauses is used by the target device to provide Bluetooth error reasons to the location server.

```
-- ASN1START
BT-TargetDeviceErrorCauses ::= SEQUENCE {
    cause       ENUMERATED {        undefined,
                                    requestedMeasurementNotAvailable,
                                    notAllrequestedMeasurementsPossible,
                                    ...
                            },
    bt-Beacon-MeasurementNotPossible                NULL    OPTIONAL,
    bt-Beacon-RTT-MeasurementNotPossible            NULL    OPTIONAL ...
}
-- ASN1STOP
```

| BT-TargetDeviceErrorCauses field descriptions |
|---|
| cause |
| This field provides a Bluetooth specific error cause. If the cause value is 'notAllRequestedMeasurementsPossible', the target device was not able to, calculate the position using Bluetooth or provide all requested Bluetooth measurements (but may be able to provide some measurements). In this case, the target device should include 'bt-Beacon-MeasurementNotPossible ' or 'bt-Beacon-RTT-MeasurementNotPossible' fields, as applicable. |

3GPP TS 36.355 Section 6.5.6 entitled "Barometric Sensor" can be modified to include WLAN, WPAN (e.g., BT), and/or Sensor location information as follows.
3GPP TS 36.355 Section 6.5.6.1 entitled "Barometric Sensor Vertical Location Information" can be modified to include WLAN, WPAN (e.g., BT), and/or Sensor location information as follows.
Sensors-ProvideLocationInformation
The IE Sensors-ProvideLocationInformation is used by the target device, operating in UE-assisted mode, to provide pressure sensor measurements to the location server.

```
-- ASN1START
Sensors-ProvideLocationInformation ::= SEQUENCE {
    sensors-MeasurementInformation      Sensors-MeasurementInformation   OPTIONAL,
    sensors-Error                       Sensors-Error                    OPTIONAL,
    ...
}
-- ASN1STOP
```

3GPP TS 36.355 Section 6.5.6.2 entitled "Barometric Sensor Location Information Elements" can be modified to include WLAN, WPAN (e.g., BT), and/or Sensor location information as follows.
Sensors-MeasurementInformation
The IE Sensors-MeasurementInformation is used by the target device to provide barometric sensors measurements to the location server.

```
-- ASN1START
Sensors-MeasurementInformation   ::= SEQUENCE {
    uncompensatedBarometricPressure     INTEGER (30000..115000)     OPTIONAL,
    locationReferencetime               LocationReferencetime       OPTIONAL,
    ...
```

```
}
-- ASN1STOP
```

| Sensors-MeasurementInformation field descriptions |
|---|
| uncompensatedBarometricPressure |
| This field specifies the measured atmospheric pressure in units of Pascal (Pa) (corresponding to a numerical altitude resolution of about 0.1 m at sea level). This field shall be obtained from the measured atmospheric pressure output of one or more sensors on the target prior to any adjustment made externally to the sensor(s). |

3GPP TS 36.355 Section 6.5.6.3 entitled "Barometric Sensor Location Information Request" can be modified to include WLAN, WPAN (e.g., BT), and/or Sensor location information as follows.

Sensors-RequestLocationInformation

The IE Sensors-RequestLocationInformation is used by the location server to request barometric sensors location measurements from a target device.

```
-- ASN1START
Sendors-RequestLocationInformation ::= SEQUENCE {
    requestedSensorsMeasurements    BIT STRING { ubp (0) } (SIZE(1..8)) OPTIONAL ...
}
-- ASN1STOP
```

| Sensors-RequestLocationInformation field descriptions |
|---|
| requestedSensorsMeasurements |
| This field specifies the sensor measurements requested. This is represented by a bit string, with a one-value at the bit position means the particular measurement is requested; a zero-value means not requested. |

3GPP TS 36.355 Section 6.5.6.4 entitled "Barometric Sensor Capability Information" can be modified to include WLAN, WPAN (e.g., BT), and/or Sensor location information as follows.

Sensors-ProvideCapabilities

The IE Sensors-ProvideCapabilities is used by the target device to indicate its capability to support Sensors and to provide its Sensors supported modes to the location server.

```
-- ASN1START
Sensors-ProvideCapabilities ::= SEQUENCE {
    Sensors-Modes           PositioningModes,
    ...
}
-- ASN1STOP
```

| Sensors-Provide-Capabilities field descriptions |
|---|
| Sensors-Modes |
| This field specifies the pressure sensor mode(s) supported by the target device. This is represented by a bit string, with a one-value at the bit position means the particular Sensor mode is supported; a zero-value means not supported. |

3GPP TS 36.355 Section 6.5.6.5 entitled "Barometric Sensor Capability Information Request" can be modified to include WLAN, WPAN (e.g., BT), and/or Sensor location information as follows.

Sensors-RequestCapabilities

The IE Sensors-RequestCapabilities is used by the location server to request Pressure sensors positioning capabilities from a target device.

```
-- ASN1START
Sensors-RequestCapabilities ::= SEQUENCE {
    ...
}
-- ASN1STOP
```

3GPP TS 36.355 Section 6.5.6.6 entitled "Sensors Error Elements" can be modified to include WLAN, WPAN (e.g., BT), and/or Sensor location information as follows.

Sensors-Error

The IE Sensors-Error is used by the location server or target device to provide pressure sensor(s) error reasons.

```
-- ASN1START
Sensors-Error ::= CHOICE {
    targetDeviceErrorCauses   Sensors-TargetDeviceErrorCauses,
    ...
}
-- ASN1STOP
```

Sensors-DeviceTargetErrorCauses

The IE Sensors-TargetDeviceErrorCauses is used by the target device to provide Sensors error reasons to the location server.

```
-- ASN1START
    Sensors-TargetDeviceErrorCauses      ::= SEQUENCE {
        cause       ENUMERATED {    undefined,
                                    requestedMeasurementNotAvailable,
                                    ...
                                },
        sensors-UBP-MeasurementhNotPossible         NULL   OPTIONAL,
    ...
    }
-- ASN1STOP
```

Sensors-TargetDeviceErrorCauses field descriptions cause

This field provides a Pressure sensors specific error cause. If the cause value is 'requestedMeasurementNotAvailable', the target device was not able to, calculate the vertical position using pressure sensors or provide requested pressure sensors measurements. In this case, the target device should include "sensors-UBP-MeasurementNotPossible fields", as applicable.

What is claimed is:

1. A method for estimating an indoor location of a wireless communication device, the method comprising:
by the wireless communication device:
providing capability information of the wireless communication device to an Evolved Universal Terrestrial Radio Access (E-UTRA) network element of a wireless network, the capability information indicating capabilities of the wireless communication device to determine an indoor location estimate of the wireless communication device based at least in part on barometric pressure sensor measurements and on one or more of: wireless local area network (WLAN) access point (AP) measurements or wireless personal area network (WPAN) measurements;
receiving from the E-UTRA network element an indication of an indoor location determination method preference including a standalone device-based indoor location determination method;
determining the indoor location estimate of the wireless communication device based at least in part on the barometric pressure sensor measurements and one or more of: the WLAN AP measurements or the WPAN measurements; and
providing the indoor location estimate of the wireless communication device to the E-UTRA network element of the wireless network,
wherein the capability information provided to the E-UTRA network element indicates the wireless communication device supports the standalone device-based indoor location determination method.

2. The method of claim 1, wherein the wireless communication device provides the indoor location estimate to the E-UTRA network element of the wireless network in a Long Term Evolution (LTE) Positioning Protocol (LPP) message.

3. The method of claim 2, wherein the LPP message further comprises an indication of one or more types of measurements used by the wireless communication device to determine the indoor location estimate.

4. The method of claim 2, wherein the LPP message comprises a provide location information message provided by the wireless communication device in response to receipt of a request location information message from the E-UTRA network element of the wireless network.

5. The method of claim 1, wherein the wireless communication device provides the indoor location estimate to the E-UTRA network element of the wireless network as part of an emergency services connection.

6. The method of claim 5, wherein the emergency services connection comprises an enhanced 911 (E911) connection.

7. The method of claim 5, wherein the indoor location estimate comprises estimates of a horizontal, planar location position and a vertical location position of the wireless communication device.

8. The method of claim 7, wherein the horizontal, planar location position estimate comprises a longitude estimate and a latitude estimate, and the vertical location position estimate comprises an altitude estimate of the wireless communication device.

9. The method of claim 1, further comprising:
by the wireless communication device
receiving, from the E-UTRA network element of the wireless network, barometric pressure sensor reference data and one or more of: WLAN AP information or WPAN information,
wherein the determining the indoor location estimate of the wireless communication device is further based at least in part on the barometric pressure sensor reference data and one or more of: the WLAN AP information or the WPAN information.

10. The method of claim 9, wherein the WLAN AP information or the WPAN information received from the E-UTRA network element of the wireless network by the wireless communication device comprises identifiers for one or more WLAN APs and/or WPANs.

11. The method of claim 9, wherein the barometric pressure sensor reference data received from the E-UTRA network element of the wireless network by the wireless communication device comprises one or more mean sea level pressure values.

12. The method of claim 1, further comprising the wireless communication device:
receiving a capabilities inquiry message from the E-UTRA network element of the wireless network,
wherein the wireless communication device provides the capability information to the E-UTRA network element of the wireless network in response to receipt of the capabilities inquiry message from the E-UTRA network element of the wireless network.

13. The method of claim 1, wherein the wireless communication device provides the indoor location estimate to the E-UTRA network element of the wireless network in a provide location information message in response to receipt of a request location information message from the E-UTRA network element.

14. The method of claim 1, wherein the E-UTRA network element comprises an evolved serving mobile location center (E-SMLC).

15. The method of claim 1, wherein the determining the indoor location estimate of the wireless communication device is further based at least in part on one or more of: global positioning system (GPS) signals or global navigation satellite system (GNSS) signals received by the wireless communication device.

16. A wireless communication device comprising:
wireless circuitry comprising at least one transceiver and at least one antenna; and
processing circuitry comprising one or more processors communicatively coupled to a memory storing instructions that when executed by the one or more processors cause the wireless communication device to:
provide capability information of the wireless communication device to an Evolved Universal Terrestrial Radio Access (E-UTRA) network element of a wireless network, the capability information indicating capabilities of the wireless communication device to determine an indoor location estimate of the wireless communication device based at least in part on barometric pressure sensor measurements and on one or more of: wireless local area network (WLAN) access point (AP) measurements or wireless personal area network (WPAN) measurements;
receive from the E-UTRA network element an indication of an indoor location determination method preference including a standalone device-based indoor location determination method;
determine the indoor location estimate of the wireless communication device based at least in part on the barometric pressure sensor measurements and one or more of: the WLAN AP measurements or the WPAN measurements; and
provide the indoor location estimate of the wireless communication device in a Long Term Evolution (LTE) Positioning Protocol (LPP) message to the E-UTRA network element of the wireless network,
wherein the capability information provided to the E-UTRA network element indicates the wireless communication device supports the standalone device-based indoor location determination method.

17. The wireless communication device of claim 16, wherein the wireless communication device provides the indoor location estimate to the E-UTRA network element of the wireless network as part of an enhanced 911 (E911) connection.

18. The wireless communication device of claim 16, wherein the indoor location estimate comprises estimates of a horizontal, planar location position and a vertical location position of the wireless communication device.

19. The wireless communication device of claim 18, wherein the horizontal, planar location position estimate comprises a longitude estimate and a latitude estimate, and the vertical location position estimate comprises an altitude estimate of the wireless communication device.

20. An apparatus configurable for operation in a wireless communication device, the apparatus comprising processing circuitry comprising one or more processors communicatively coupled to a memory storing instructions that when executed by the one or more processors cause the wireless communication device to:
provide capability information of the wireless communication device to an Evolved Serving Mobile Location Center (E-SMLC) of a Long Term Evolution (LTE) wireless network, the capability information indicating capabilities of the wireless communication device to determine an indoor location estimate of the wireless communication device based at least in part on barometric pressure sensor measurements and on one or more of: wireless local area network (WLAN) access point (AP) measurements or wireless personal area network (WPAN) measurements;
receive from the E-SMLC of the LTE wireless network an indication of an indoor location determination method preference including a standalone device-based indoor location determination method;
determine the indoor location estimate of the wireless communication device based at least in part on the barometric pressure sensor measurements and one or more of: the WLAN AP measurements or the WPAN measurements; and
provide the indoor location estimate of the wireless communication device in an LTE Positioning Protocol (LPP) message to the E-SMLC of the LTE wireless network,
wherein the capability information provided to the E-SMLC of the LTE wireless network indicates the wireless communication device supports the standalone device-based indoor location determination method.

21. The apparatus of claim 20, wherein the wireless communication device provides the indoor location estimate to the E-UTRA network element of the wireless network as part of an enhanced 911 (E911) connection.

22. The apparatus of claim 20, wherein the indoor location estimate comprises estimates of a horizontal, planar location position and a vertical location position of the wireless communication device.

23. The apparatus of claim 22, wherein the horizontal, planar location position estimate comprises a longitude estimate and a latitude estimate, and the vertical location position estimate comprises an altitude estimate of the wireless communication device.

* * * * *